(12) United States Patent
Dotson

(10) Patent No.: US 7,551,163 B1
(45) Date of Patent: Jun. 23, 2009

(54) MINIMUM MOVE TOUCH PLANE SCANNING METHOD AND DEVICE

(75) Inventor: Gary Dan Dotson, Muskego, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 465 days.

(21) Appl. No.: 11/272,936

(22) Filed: Nov. 14, 2005

Related U.S. Application Data

(63) Continuation of application No. 09/675,863, filed on Sep. 29, 2000, now Pat. No. 6,980,201.

(51) Int. Cl.
*G06F 3/041* (2006.01)

(52) U.S. Cl. .................... 345/173; 345/174; 345/179; 178/18.01

(58) Field of Classification Search ......... 345/173–179; 178/18.01–18.04
See application file for complete search history.

(56) References Cited

U.S. PATENT DOCUMENTS

| | | | |
|---|---|---|---|
| 4,413,314 A | 11/1983 | Slater et al. |
| 4,581,483 A | 4/1986 | Ralston |
| 4,698,625 A | 10/1987 | McCaskill et al. |
| 4,908,620 A | 3/1990 | Fujisawa |
| 4,942,514 A | 7/1990 | Miyagaki et al. |

(Continued)

FOREIGN PATENT DOCUMENTS

WO    WO 98/49650 A1    11/1998

OTHER PUBLICATIONS

Prentice Hall's Illustrated Dictionary of Computing, 2nd Ed., 1995, p. 59.

(Continued)

*Primary Examiner*—Richard Hjerpe
*Assistant Examiner*—Kimnhung Nguyen
(74) *Attorney, Agent, or Firm*—Turocy & Watson, LLP; Alexander R. Kuszewski

(57) ABSTRACT

A method of determining a type of touch plane operator input device comprises sensing the impedance across first and second terminals of a touch plane operator input device to distinguish the touch plane operator input device as being one of at least two different types of touch plane operator input devices. A method of processing an input from a touch plane operator input device comprises determining a first location of a first touch on the touch plane operator input device; determining a second location of a second touch on the touch plane operator input device; comparing the first and second locations to obtain an indication of an amount of difference between the first and second locations; and determining whether the indication of the amount of difference exceeds a predetermined amount. These steps are performed by discrete logic circuitry that provides an event notification to a microprocessor when the indication of the amount of difference exceeds the predetermined amount. An interface circuit for a touch plane operator input device comprises a digital signal processor that includes a data processing path along which data from a touch plane operator input device passes while being processed by the digital signal processor. The interface circuit is capable of processing data from first and second different types of touch plane operator input devices. The data path is a common data processing path that is the same for input data for both of the first and second types of touch plane operator input devices.

19 Claims, 11 Drawing Sheets

U.S. PATENT DOCUMENTS

| | | | |
|---|---|---|---|
| 5,014,051 A | 5/1991 | Lippman et al. | |
| 5,283,558 A | 2/1994 | Chan | |
| 5,376,947 A | 12/1994 | Kuroda | |
| 5,491,495 A * | 2/1996 | Ward et al. | 345/173 |
| 5,867,665 A | 2/1999 | Butman et al. | |
| 5,880,411 A | 3/1999 | Gillespie et al. | |
| 6,023,265 A | 2/2000 | Lee | |
| 6,037,930 A | 3/2000 | Wolfe et al. | |
| 6,040,824 A | 3/2000 | Maekawa et al. | |
| 6,088,628 A | 7/2000 | Watanbe et al. | |
| 6,163,313 A | 12/2000 | Aroyan et al. | |
| 6,229,472 B1 | 5/2001 | Nishida | |
| 6,278,444 B1 | 8/2001 | Wilson et al. | |
| 6,292,181 B1 | 9/2001 | Banerjee et al. | |
| 6,373,475 B1 | 4/2002 | Challis | |
| 6,445,383 B1 | 9/2002 | Chambers et al. | |
| 6,466,203 B2 * | 10/2002 | Van Ee | 345/173 |
| 7,030,860 B1 * | 4/2006 | Hsu et al. | 345/173 |
| 2002/0093491 A1 * | 7/2002 | Gillespie et al. | 345/173 |

OTHER PUBLICATIONS

The new IEEE Standard Dictionary of Electrical and Electronics Terms, 5th Ed., 1993, p. 1051.

Setup and User Manual Hampshire TSHARC-8 Touch Screen Controller Board (Revision 1.6) pp. 3 & 7.

\* cited by examiner

"Prior Art"

"Prior Art"

"Prior Art"

"Prior Art"

MINIMUM MOVE TOUCH PLANE SCANNING METHOD AND DEVICE

CROSS-REFERENCE TO RELATED APPLICATIONS

This application is a continuation of U.S. patent application Ser. No. 09/675,863, filed Sep. 29, 2000, and entitled, "MINIMUM MOVE TOUCH PLANE SCANNING METHOD AND DEVICE." The entirety of the aforementioned application is incorporated herein by reference.

BACKGROUND OF THE INVENTION

1. Field of the Invention

This invention relates to interface circuits for touch screens. This invention also relates to methods of processing inputs from touch screens. This invention also relates to integrated circuits that include interfaces for touch screens.

2. Description of Related Art

Touch plane operator input devices, such as touch screens and touch pads, are known. Typically, a touch plane operator input device provides a generally planar surface that is sensitive to the touch of an operator and is operative to provide one or more output signals indicative of the location of the touch on the plane. The output signals may be based either on the raw data from a touch screen sensor system, or may be based on processed data that provides X-Y coordinate information of the touch.

Touch screens are an enhanced type of computer display device that include a touch plane operator input device. Touch screens are therefore capable not only of displaying information to an operator, but also of receiving inputs from the operator. Touch screens have been put to use in a wide variety of applications. Such applications include consumer applications such as personal digital assistants (PDAs), digital audio playback systems, internet devices, and so on, as well as industrial applications such as operator interfaces in industrial control systems. In some applications, the operator touch is made by a stylus or other device held by the operator. In other applications, the operator touches the screen directly.

Touch pads are similar in operation to touch screens, except that they are not used in connection with a display device. Touch pads are often placed adjacent the space bar on laptop computers to allow operator control of a mouse pointer. Numerous other applications also exist.

For convenience, the discussion will now focus on touch screens, it being understood that the discussion is equally applicable to touch pads and other touch plane operator input devices. In many touch screen systems, a computer system is implemented using "system-on-chip" integrated circuits. In a single chip, these integrated circuits provide many of the functions that used to be spread among many integrated circuits. For example, in addition to the main microprocessor, it is not uncommon to have other circuits such as specialized serial interfaces, UARTs, memory controllers, DMA controllers, Ethernet interfaces, display interfaces, USB (universal serial bus) interfaces, and so on, as well as a touch screen interface used to acquire data from a touch screen.

A problem that has been encountered with system-on-chip integrated circuits adapted for use with touch screens is that there are many different types of touch screens. For example, some touch screens are relatively small (e.g., three inches or less) whereas other touch screens are much larger (e.g., twenty inches or more). The interface characteristics of large touch screens tend to be different because voltage feedback provisions are made to compensate for the effects of resistance and temperature drift due to the larger screen size. Additionally, even within the feedback/nonfeedback categories of touch screens, variations exist. As a result, it has been difficult to provide a system-on-chip that is usable in a wide variety of touch screen applications because different touch screen applications tend to use different types of touch screens and different types of touch screens have different interface characteristics.

FIGS. 1A-1D below show four different types of commonly employed analog resistive touch screens. In general, most analog resistive touch screens comprise front and back resistive layers (often formed of indium tin oxide) that are pressed together when an operator touch is received. The operator touch causes the two layers to establish an electrical contact at a particular location on each layer. Therefore, by applying a voltage to one layer and reading the voltage established by electrical contact on the other layer, the location of the touch can be determined based on the known characteristics of each layer.

For example, FIG. 1A is a schematic diagram of a 4-wire analog resistive touch screen. As shown therein, the touch screen comprises an X-axis resistive layer 12 and a Y-axis resistive layer 14. The resistance of the layers 12 and 14 is shown schematically as four resistors. The X-axis layer 12 further includes an X+ bus bar 16 that connects to an X+ terminal 18 of the touch screen, and an X– bus bar 20 that connects to an X– terminal 22 of the touch screen. Similarly, the Y-axis resistive layer further includes a Y+ bus bar 26 that connects to a Y+ terminal 28 of the touch screen, and a Y– bus bar 30 that connects to a Y– terminal 32 of the touch screen. The touch screen is scanned in the X-direction by applying a voltage across the X+ and X– bus bars 16 and 20, and then sensing the voltage that appears at one or both of the Y+ and Y– terminals 28 and 32. Assuming negligible current flow through the Y+ and Y– terminals, the voltage at the Y+ and Y– terminals 28 and 32 should be approximately the same and is determined by the X-coordinate of the point of electrical contact between the X-axis and Y-axis layers 12 and 14, that is, by the X-coordinate of the touch. By comparing the voltage to values determined during calibration, the X-coordinate of the touch can be determined. The Y-coordinate of the touch is then determined in the same manner, except that a voltage is applied across the Y+ and Y– bus bars 26 and 30, and the resultant voltage that appears at one or both of the X+ and X– terminals 18 and 22 is sensed. Of course, with all touch screens, X and Y axis definitions are arbitrary and different definitions can be coordinated with program code to determine screen position.

FIG. 1B is a schematic diagram of an 8-wire analog resistive touch screen. The 8-wire touch screen is the same as the 4-wire touch screen, except that four additional sX+, sX–, sY+ and sY– feedback terminals 40-43 are provided. Typically, both 4-wire touch screens and 8-wire touch screens use an analog-to-digital converter to sense the voltages that appear at the X+ and Y+ terminals. In the case of a 4-wire touch screen, the reference voltage inputs to the analog-to-digital converter are connected directly to the same positive and ground terminals of a power supply that also applies voltages to the touch screen. In the case of an 8-wire touch screen, the reference voltage inputs are connected to sX+ and sX– terminals 40 and 42 of the X+ and X– bus bars or to sY+ and sY– terminals 41 and 43 of the Y+ and Y– bus bars, respectively. The sX+, sX–, sY+ and sY– terminals 40-43 are used for voltage feedback to eliminate the effects of resistance and temperature drift in the circuit components.

FIG. 1C is a schematic diagram of a 5-wire analog resistive touch screen. The 5-wire analog resistive touch screen includes a resistive layer 52 and a wiper layer 54. The resistive layer includes V+, V−, Z+/−, and Z−/+ terminals 56-59 at the four opposing corners of the touch screen. A constant voltage is applied to the V+ and V− terminals 56-57. The X and Y axes are scanned by applying a voltage at the Z+/Z− and Z−/Z+ terminals 58-59, and then reversing the polarity of the voltage to scan the other direction. The resulting two voltages produced at the wiper terminal 60 are indicative of the X and Y-positions of the touch.

FIG. 1D is a schematic diagram of a 7-wire analog resistive touch screen. The 7-wire touch screen is the same as the 5-wire touch screen, except that two additional sV+ and sV− feedback terminals 61-62 are provided. As with the sX+, sX−, sY+ and sY− feedback terminals 40-43, the sV+ and sV− feedback terminals 61-62 are used for voltage feedback to eliminate the effects of resistance and temperature drift in the circuit components.

Analog resistive touch screens are popular because they are inexpensive and reliable. However, other types of touch screens are also common, such as capacitive touch screens and electrostatic touch screens.

In view of these different types of touch screens, a touch screen interface that is compatible with these multiple different types of touch screens would be highly advantageous. A touch screen interface that is capable of automatically detecting the type of touch screen to which it is connected would also be highly desirable.

Another problem that has been encountered in connection with touch screens is the processing overhead required to process information from touch screens. It is known to emulate a hardware mouse by moving a mouse pointer across a touch screen in response to an operator touch that moves across the touch screen. It is desirable to have smooth and responsive mouse pointer movement. Current techniques for obtaining a satisfactory level of responsiveness require a significant amount of processor overhead, however, because the microprocessor scans the touch screen directly or because the microprocessor must monitor a continuous stream of data from a separate scanning module or hardware. For example, dragging a cursor around the screen in random directions on a Microsoft® Windows™ NT system that supports hardware cursoring can register an additional 3% to 7% of the processing power of a 300 MHz Pentium II™ system under the task monitor program. By comparison, major architectural or processor step changes usually provide only a 5% to 10% processing speed improvement. A touch screen interface that reduces the amount of microprocessor overhead required for hardware mouse emulation would be advantageous. This is especially important in embedded solutions and PDAs where high power processors are less cost effective. Therefore, a touch screen interface that minimizes process or overhead would also be highly advantageous, especially if it is capable of detecting the type of touch screen to which it is detected and/or is compatible with multiple different types of touch screens.

Another ongoing challenge that has been encountered is trying to reduce power consumption to extend battery life in devices such as personal digital assistants, laptop computers, portable internet access devices, and so on. A touch screen interface that decreases power consumption would therefore be highly advantageous.

SUMMARY OF THE INVENTION

According to one aspect of the invention, the invention relates to a method of determining a type of a touch plane operator input device comprising sensing the impedance across first and second terminals of a touch plane operator input device to distinguish the touch screen as being one of at least two different types of touch plane operator input devices.

According to another aspect of the invention, the invention relates to a method of processing an input from a touch plane operator input device comprising determining a first location of a first touch on the touch plane operator input device; determining a second location of a second touch on the touch plane operator input device; comparing the first and second locations to obtain an indication of an amount of difference between the first and second locations; and determining whether the indication of the amount of difference exceeds a predetermined amount. These steps are performed by discrete logic circuitry that provides an event notification to a microprocessor when the indication of the amount of difference exceeds the predetermined amount.

According to yet another aspect of the invention, the invention relates to an interface circuit for a touch plane operator input device, the interface circuit comprising a digital signal processor that includes a data processing path along which data from a touch plane operator input device passes while being processed by the digital signal processor. The interface circuit is capable of processing data from at least first and second different types of touch plane operator input devices. The data path is a common data processing path that is the same for input data regardless of which type of touch plane operator input device is used.

According to yet another aspect of the invention, the invention relates to a method of acquiring an operator input from a touch plane operator input device having first and second touch-sensitive layers. The method comprises waiting for an operator touch to occur on the touch plane operator input device; and then detecting that the operator touch has occurred and determining the location of the operator touch. The first and second layers are substantially free of current flow during the waiting step.

DETAILED DESCRIPTION OF THE PREFERRED EMBODIMENT

1. Construction of Touch Screen Interface Circuit

Figure 1A:
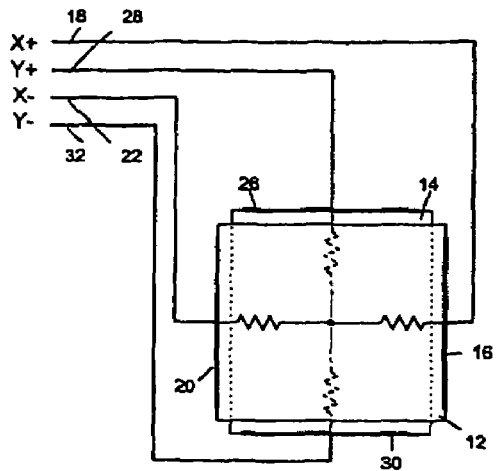
FIGS. 1A-1D are schematic diagrams of analog resistive touch screens, appropriately labeled "prior art"
Figure 1B:
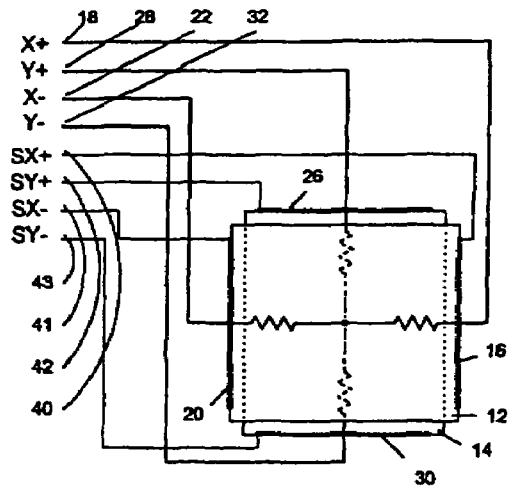
Figure 1C:
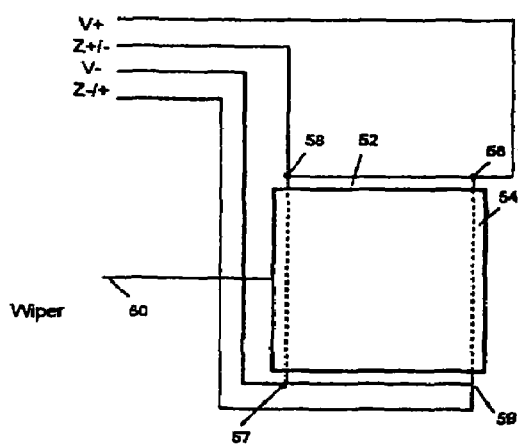
Figure 1D:
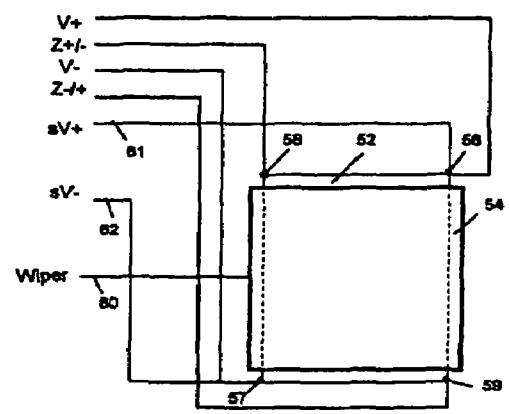
Figure 2:
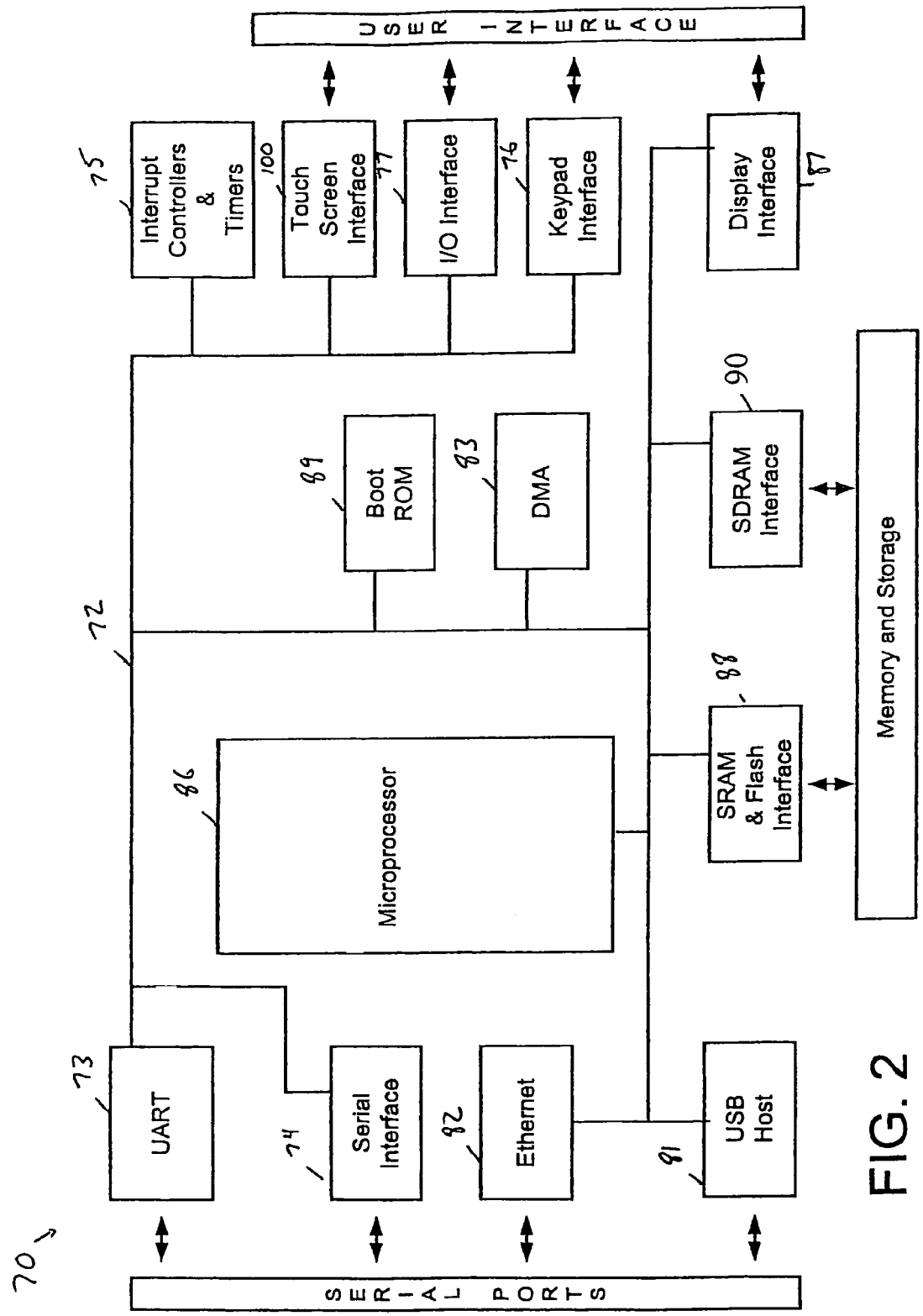
FIG. 2 is a block diagram of a system-on-chip integrated circuit that includes a touch screen interface circuit.

Referring now to FIG. 2, FIG. 2 is a block diagram of an example of a system-on-chip integrated circuit 70 that includes a touch screen interface circuit 100 in accordance with a preferred embodiment of the present invention. The integrated circuit 70 includes a plurality of devices that are disposed on a peripheral bus 72 including one or more universal asynchronous receiver-transmitters (UARTs) 73, one or more serial interfaces 74 for interfacing to external devices (such as digital to analog converters (DACs), audio controllers, and so on), interrupt controller/timers 75, a keypad interface 76, one or more I/O ports 77, and a touch screen interface circuit 100 (described in greater detail below). The integrated circuit 70 also includes a plurality of devices that are disposed on a processor bus 80 including one or more universal serial bus (USB) host interfaces 81 for connection to USB devices such as a keyboard, mouse, printer, and so on, an Ethernet port 82, DMA controllers 83, a microprocessor 86, a display interface 87 (for example, a raster engine), memory controllers 88 and 90, and boot ROM 89 for storing program code executed during a boot-up sequence.

Figure 3:
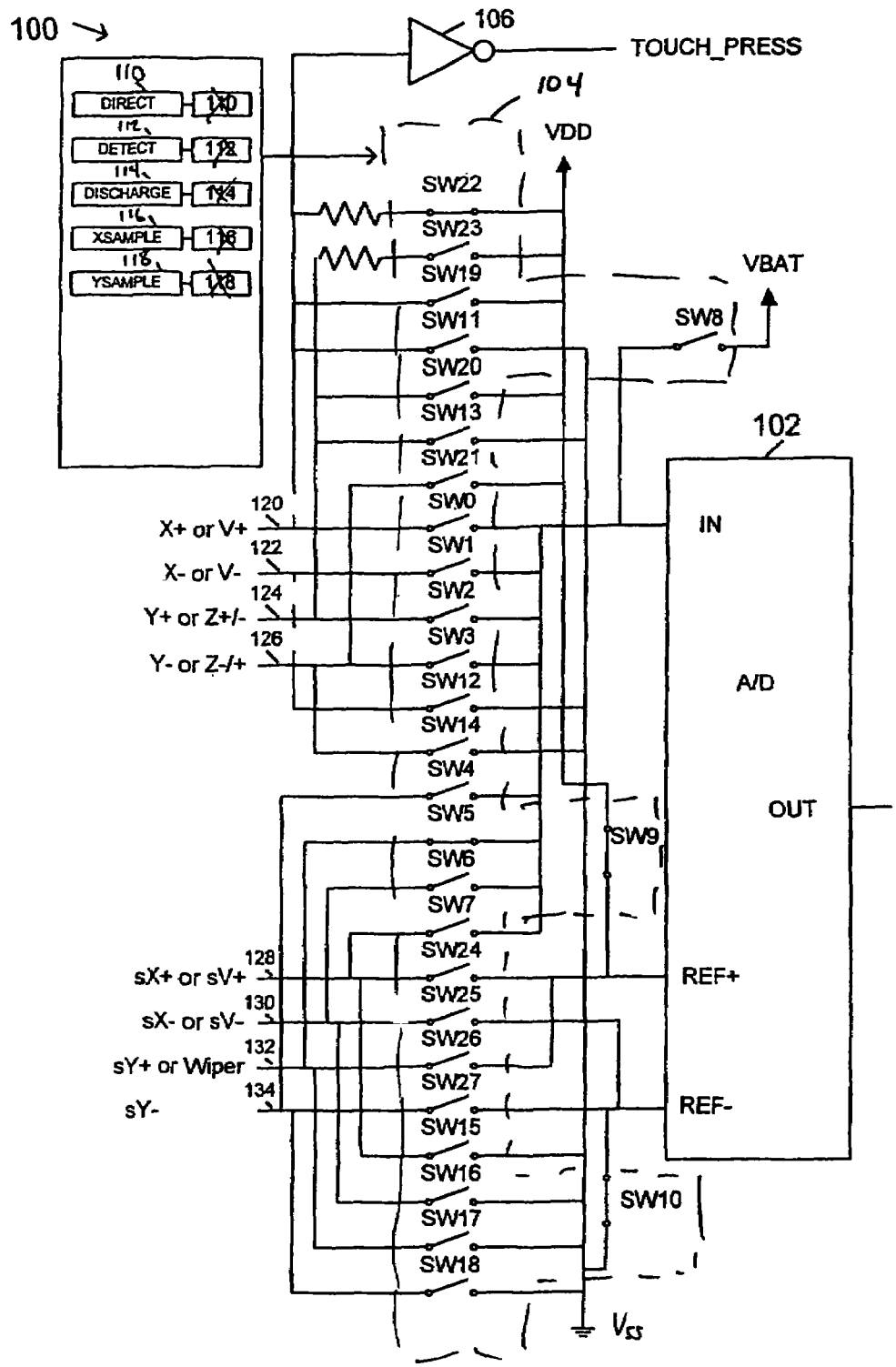
FIG. 3 is a schematic diagram of the touch screen interface circuit of FIG. 2 shown in greater detail.
Figure 7:
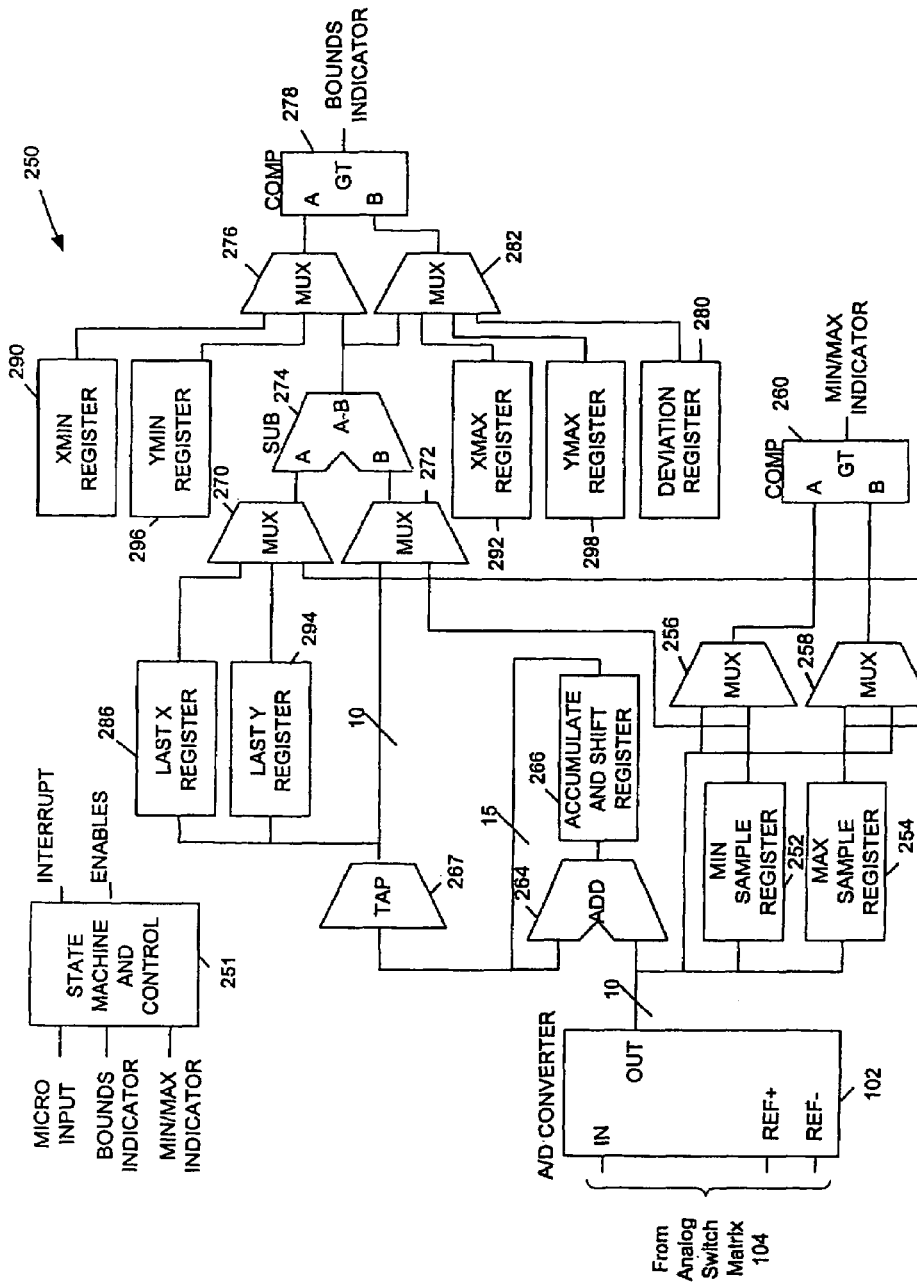
FIG. 7 is a block diagram of a logic circuit that is used to implement the process of FIG. 6.

Referring now to FIG. 3, a portion of the preferred touch screen interface circuit 100 of FIG. 2 is illustrated in greater detail. The remainder of the preferred interface circuit is shown in FIG. 7, discussed in greater detail below. In FIG. 3, the interface circuit 100 comprises an analog-to-digital (A/D) converter 102, an analog switch matrix 104, and an inverting logic gate 106. The analog-to-digital converter 102 may be implemented using virtually any A/D conversion technique. In the illustrated embodiment, the A/D converter 102 is a successive approximation A/D converter or a delta sigma A/D converter.

The analog switch matrix 104 comprises twenty-eight analog switches, labeled SW0-SW27. The configuration of the switch matrix 104 is controlled by a plurality of registers including a DIRECT register 110, a DETECT register 112, a DISCHARGE register 114, an XSAMPLE register 116, and a YSAMPLE register 118. Additional registers may also be utilized if it is desired to achieve additional functionality using the analog switch matrix 104.

The registers 110-118 control the configuration of the analog switch matrix. The configuration of the switch matrix 104 as shown in FIG. 3 is characterized by the following bit string: 0000 0100 0000 0000 0110 0010 0000. The bits in the foregoing bit string correspond to the open/closed states of the switches SW0-SW27 in FIG. 3, with the number of the switch (0-27) indicating bit position and a "1" at a particular bit position indicating that a particular switch is closed. Different configurations of the analog switch matrix can be obtained with different bit strings. These bit strings may be stored in the registers 110-118 or, alternatively, may be provided directly by the microprocessor. As will be described in greater detail below, each register controls 110-118 the configuration of the analog switch matrix 104 during a different mode of operation. Different values may be stored in the registers 112-118 depending on which type of touch screen is used.

The analog switch matrix includes eight input/output (I/O) terminals 120-134. The first terminal 120 is labeled "X+ or V+", indicating that the terminal 120 is adapted to be operably connected to the X+ terminal of 4-wire and 8-wire touch screens, and is adapted to be operably connected to the V+ terminal of 5-wire and 7-wire touch screens. The second terminal 122 is labeled "X– or V–", indicating that the terminal 122 is adapted to be operably connected to the X– terminal of 4-wire and 8-wire touch screens, and is adapted to be operably connected to the V– terminal of 5-wire and 7-wire touch screens. The third terminal 124 is labeled "Y+ or Z+/–", indicating that the terminal 124 is adapted to be operably connected to the Y+ terminal of 4-wire and 8-wire touch screens, and is adapted to be operably connected to the Z+/– terminal of 5-wire and 8-wire touch screens. The fourth terminal 126 is labeled "Y– or Z–/+", indicating that the terminal 126 is adapted to be operably connected to the Y-terminal of 4-wire and 8-wire touch screens and is adapted to be operably connected to the Z–/+ terminal of 5-wire and 7-wire touch screens. The fifth terminal 128 is labeled "sX+ or sV+", indicating that the terminal 128 is adapted to be operably connected to the sX+ terminal of 8-wire touch screens and is adapted to be operably connected to the sV+ terminal of 7-wire touch screens. For 4-wire and 5-wire touch screens, the terminal 128 is not utilized. The sixth terminal 130 is labeled "sX– or sV–", indicating that the terminal 130 is adapted to be operably connected to the sX– terminal of 8-wire touch screens and is adapted to be operably connected to the sV– terminal of 7-wire touch screens. For 4-wire and 5-wire touch screens, the terminal 130 is not utilized. The seventh terminal 132 is labeled "sY+ or wiper", indicating that the terminal 132 is adapted to be operably connected to the sY+ terminal of 8-wire touch screens and is adapted to be operably connected to the wiper terminal of 7-wire touch screens. For 4-wire and 5-wire touch screens, the terminal 132 is not utilized. Finally, the eighth terminal 134 is labeled "sY–", indicating that the terminal 134 is adapted to be operably connected to the sY– terminal of 8-wire touch screens. For 4-wire, 5-wire and 7-wire touch screens, the terminal 134 is not utilized.

The analog switch matrix 104 allows the terminals 120-134 to be selectively connected to $V_{DD}$ and $V_{SS}$ power supply terminals, to an analog input of the A/D converter 102, and to the voltage reference inputs of the A/D converter 102. In the case of the terminal 120, the terminal 120 can receive the $V_{DD}$ power supply input either directly (SW11) or by way of a pull-up resistor (SW22). With the pull up resistor, the analog switch matrix 104 can supply the $V_{DD}$ power supply input to an I/O terminal of a touch screen in a way that allows the terminal 120 to be pulled low if the touch screen I/O terminal is connected to ground (either directly or by way of touch screen resistance), or to be left high if no connection to ground exists. A similar arrangement is provided for the terminal 124. As will be detailed below, this is one preferred way of enabling the touch screen interface circuit to distinguish between different types of touch screens.

2. Automatic Detection of Touch Screen Type

Figure 4A:
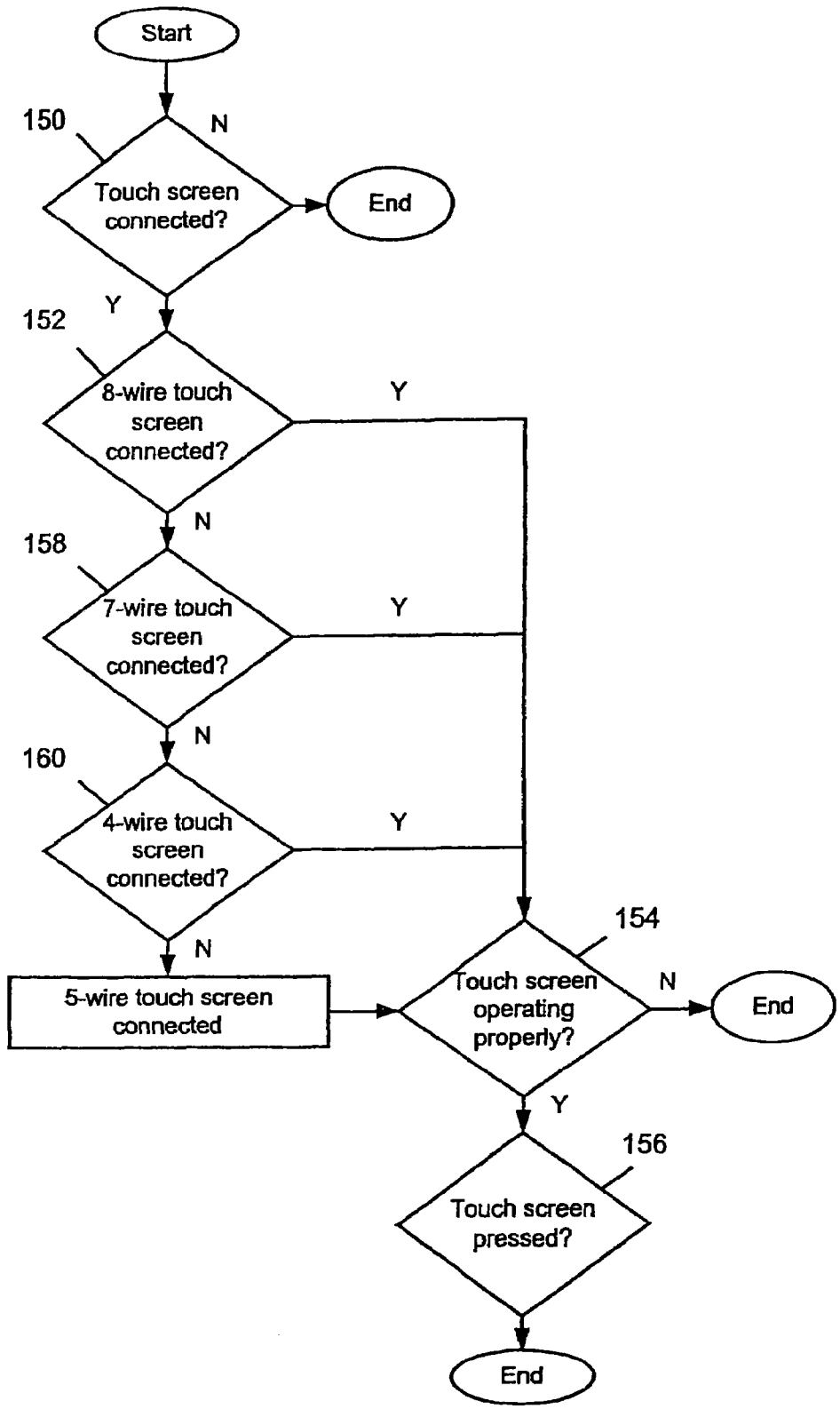
FIGS. 4A-4B are flow charts showing the operation of the touch screen interface circuit of FIG. 3 to determine a touch screen type.
Figure 4B:
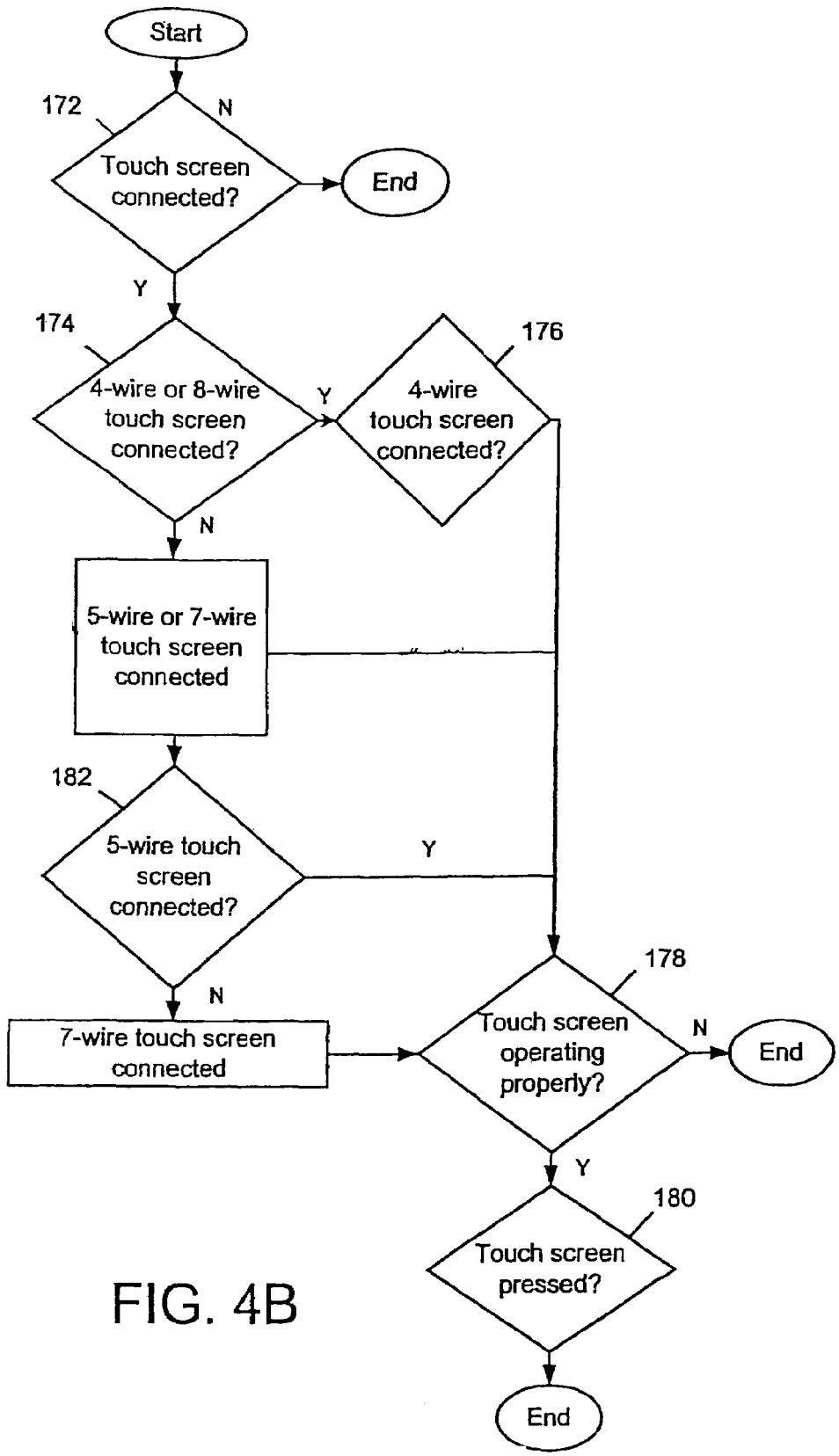

Referring now to FIGS. 4A-4B, two preferred methods of determining a touch screen type is illustrated. The touch screen interface circuit 100 is capable of receiving input data from a variety of types of touch screens, and it is desirable that the touch screen interface circuit 100 be able automatically determine the touch screen type to which it is connected. This can be accomplished by sensing the impedance characteristics of the touch screen. FIGS. 4A-4B describe two exemplary methods that can be performed during a boot-up sequence of a device that incorporates the interface circuit 100 to determine a touch screen type.

Figures 5A, 5B, 5C, 5D:
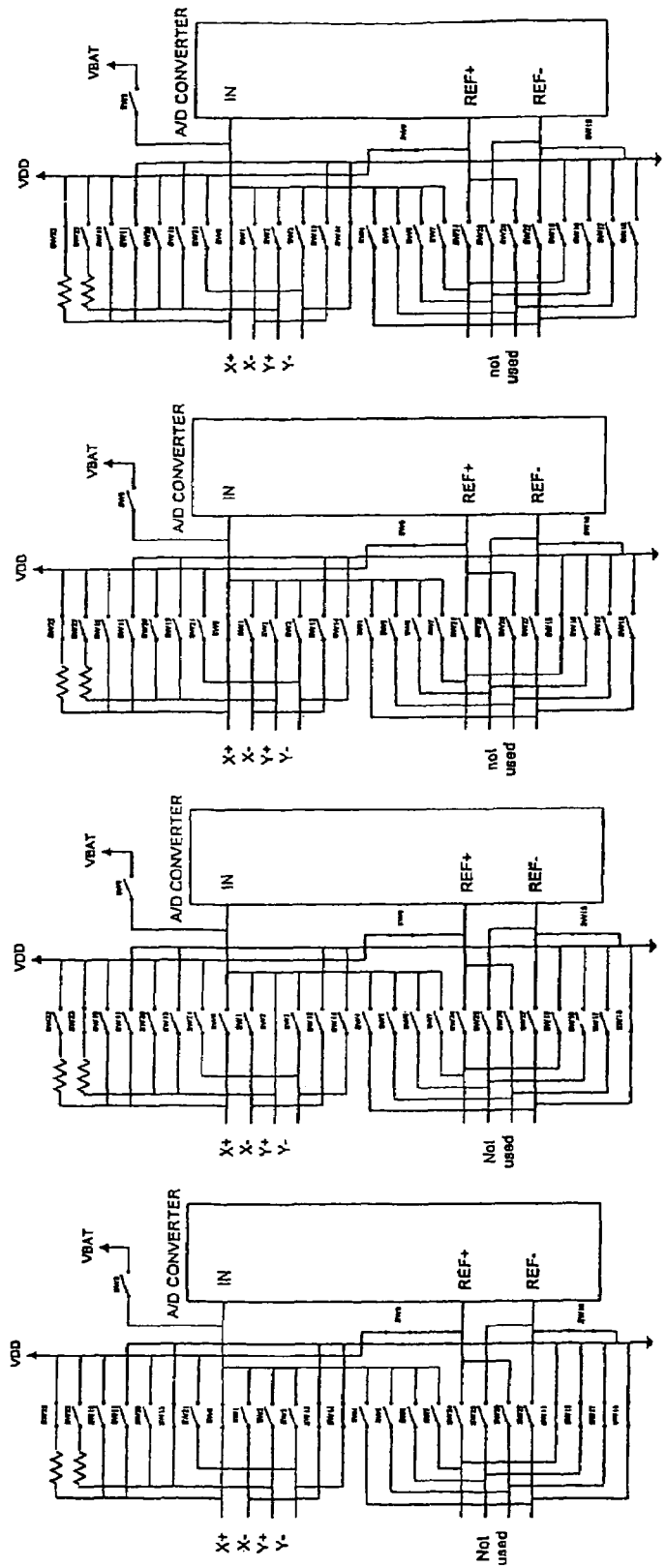
FIGS. 5A-5D are schematic diagrams showing the configuration of the touch screen interface circuit of FIG. 3 during different steps of the process of FIG. 4.

Referring first to FIG. 4A, at step 150, it is first determined whether a touch screen is connected to the interface circuit 100. FIG. 5A shows the configuration of the analog switch matrix 104 during step 150. The following table summarizes the operation of the analog switch matrix 104 during step 150:

| STEP | REGISTER | EFFECT | TEST | RESULT |
|---|---|---|---|---|
| 150 | 047F601 | Pull X+ high, Short X−, Y+, Y−, sX+, sX−, sY+, sY− to VSS | ADC conversion on X+ | Low = Touch screen connected High = No touch screen connected |

The value stored in the DIRECT register 110, which changes throughout the processes of FIGS. 4A-4B, controls the configuration of the analog switch matrix 104 during the processes of FIGS. 4A-4B. The value stored in the DIRECT register 110 during step 150 is 047F601 (hexadecimal) or 0000 0100 0111 1111 0110 0000 0001 (binary). When the analog switch matrix 104 is programmed with this value, the effect is to pull X+ high and to short the X−, Y+, Y−, sX+, sX−, sY+, and sY− terminals 122-134 to $V_{SS}$, as described in the table. The A/D converter 102 then performs an A/D conversion on the X+ terminal 120.

If a touch screen is connected, then the touch screen establishes a connection between the X+ and X− terminals 120 and 122 (i.e., in the case of a 4-wire or 8-wire touch screen, or the V+ and V− terminals in the case of a 5-wire or 7-wire touch screen), causing the X+ terminal to be pulled low. If no touch screen is connected, then no connection is established between the X+ and X− terminals 120 and 122, and the X+ terminal 120 remains pulled high. The X+ terminal 120 is also connected to the input of the A/D converter 102 and, therefore, the voltage at the X+ terminal 120 can be measured using the A/D converter 102 to determine whether a touch screen is connected. If no touch screen is connected, then the auto detect process terminates, and, for example, the user may be notified that no touch screen has been detected.

Assuming a touch screen is connected, it is next determined at step 152 whether an 8-wire touch screen is connected or whether another type of touch screen is connected. FIG. 5B shows the configuration of the analog switch matrix 104 during step 152. The following table summarizes the operation of the analog switch matrix 104 during steps 152-156:

| STEP | REGISTER | EFFECT | TEST | RESULT |
|---|---|---|---|---|
| 152 | 0840604 | Pull Y+ high, Short sY− to VSS | ADC conversion on Y+ | High = Other type of touch screen connected Low = 8-wire touch screen connected |
| 154 | 0401601 | Pull X+ high, Short X− to VSS | check that X+ is low | Operational |
| 154 | 0408601 | Pull X+ high, Short sX+ to VSS | check that X+ is low | Operational |
| 154 | 0410601 | Pull X+ high, Short sX− to VSS | check that X+ is low | Operational |
| 154 | 0804604 | Pull Y+ high, Short Y− to VSS | check that Y+ is low | Operational |
| 154 | 0820604 | Pull Y+ high, Short sY+ to VSS | check that Y+ is low | Operational |
| 156 | 0402601 | Pull X+ high, Short Y+ to VSS | ADC conversion on X+ | Low = touch screen pressed or shorted High = No touch screen press |

If an 8-wire touch screen is connected, then the Y+ terminal 120 is pulled low because the sY− terminal establishes a connection to ground. For all other touch screen types, the sY− terminal is unused and therefore the Y+ terminal remains high. As a result, when the switch matrix 104 is configured as shown in FIG. 5B, the voltage at the Y+ terminal 120 can be measured using the A/D converter 102 to determine whether an 8-wire touch screen is connected.

If an 8-wire touch screen is connected, then the process proceeds to step 154, where it is determined whether the touch screen is operating properly. The various configurations for the analog switch matrix 104 are set forth in the table above. If all the conditions in the table are met, then the touch screen is operating properly; otherwise, the touch screen is not operating properly.

Next, at step 156, it is determined whether the touch screen is pressed. This feature may be useful, for example, to give the operator the option to proceed to a "setup" screen during a boot-up process. To perform this test, the X+ terminal 120 is pulled high and the Y+ terminal 124 is connected to the ground terminal, and it is determined whether the X+ terminal 120 is high or low (i.e., whether the X-axis layer is touching the Y-axis layer). If the X+ terminal 120 is low, then the touch screen is pressed (although an alternative reason may be that the touch screen is shorted). If the X+ terminal 120 is high, then the touch screen is not pressed.

If it is determined at step 152 that an 8-wire touch screen is not connected to the interface circuit 100, then the process proceeds to step 158. At step 158, it is determined whether a 7-wire touch screen is connected or whether another type of touch screen is connected. FIG. 5C shows the configuration of the analog switch matrix 104 during step 158. The following table summarizes the operation of the analog switch matrix 104 during step 158 and steps 154-156 for a 7-wire touch screen:

| STEP | REGISTER | EFFECT | TEST | RESULT |
|---|---|---|---|---|
| 158 | 0408601 | Pull X+ high, Short sX+ to VSS | ADC conversion on X+ | High = Other type of touch screen connected Low = 7-wire touch screen connected (5 wire with feedback) |
| 154 | 0401601 | Pull X+ high, Short X− to VSS | check that X+ is low | Operational |
| 154 | 0402601 | Pull X+ high, Short Y+ to VSS | check that X+ is low | Operational |
| 154 | 0404601 | Pull X+ high, Short Y− to VSS | check that X+ is low | Operational |
| 154 | 0408601 | Pull X+ high, Short sX+ to VSS | check that X+ is low | Operational |
| 154 | 0410601 | Pull X+ high, Short sX− to VSS | check that X+ is low | Operational |

-continued

| STEP | REGISTER | EFFECT | TEST | RESULT |
|------|----------|--------|------|--------|
| 156 | 0420601 | Pull X+ high, Short sY+ to VSS | ADC conversion on X+ | Low = touch screen pressed or shorted High = No touch screen press |

If a 7-wire touch screen is connected, then the X+ terminal 120 is pulled low because the only touch screen types that have sX+ and sX− connected are the 7-wire and 8-wire touch screens, and the 8-wire touch screen has already been eliminated. As a result, when the switch matrix 104 is configured as shown in FIG. 5C, the voltage at the X+ terminal 120 can be measured using the A/D converter 102 to determine whether an 7-wire touch screen is connected.

If a 7-wire touch screen is connected, then the process proceeds to step 154, where it is determined whether the touch screen is operating properly. The various configurations for the analog switch matrix 104 are set forth in the table above. If all the conditions in the table are met, then the touch screen is operating properly; otherwise, the touch screen is not operating properly.

Next, at step 156, it is determined whether the touch screen is pressed. To perform this test, the X+ terminal 120 is pulled high and the wiper terminal 132 is connected to the ground terminal, and it is determined whether the X+ terminal 120 is high or low (i.e., whether the X-axis layer is touching the wiper layer). If the X+ terminal 120 is low, then the touch screen is pressed (although an alternative reason may be that the touch screen is shorted). If the X+ terminal 120 is high, then the touch screen is not pressed.

If it is determined at step 158 that an 7-wire touch screen is not connected to the interface circuit 100, then the process proceeds to step 160. At step 160, it is determined whether a 4-wire touch screen is connected or whether a 5-wire touch screen is connected. The following table summarizes the operation of the analog switch matrix 104 during step 160:

| STEP | REGISTER | EFFECT | TEST | RESULT |
|------|----------|--------|------|--------|
| 160 | 0404601 | Pull X+ high, Short Y− to VSS | ADC conversion on X+ | High = 4-wire touch screen connected Low = 4-wire touch screen (pressed or shorted) or 5-wire touch screen connected |
| 160 | 0402601 | Pull X+ high, Short Y+ to VSS | ADC conversion on X+: voltage A | Conversion value (A < C and B < C and D < F and E < F) = 5-wire touch screen |
| 160 | 0600601 | Pull X+ high, Short Y− to VSS | ADC conversion on X+: voltage B | |
| 160 | 0401601 | Pull X+ high, Short X− to VSS | ADC conversion on X+: voltage C | Conversion value (A > C or B > C or D > F or E > F) = 4-wire touch screen |
| 160 | 0800E04 | Pull Y+ high, Short X+ to VSS | ADC conversion on Y+: voltage D | |
| 160 | 0801604 | Pull Y+ high, Short X− to VSS | ADC conversion on Y+: voltage E | |
| 160 | 0804604 | Pull Y+ high, Short Y− to VSS | ADC conversion on Y+: voltage F | |

The first step is to determine if a 4-wire touch screen can be directly detected. This is done by determining whether the X-axis and Y-axis layers of the screen are connected. In the case of a 5-wire touch screen, the same layer is used for both the X-axis and the Y-axis, and therefore the X+ terminal 18 and the Y-terminal 32 are resistively connected. In the case of a 4-wire touch screen, the X-axis and Y-axis layers are different, and therefore connecting the Y-axis layer to ground will only pull the x-axis layer low if the touch screen is being pressed. Although this is also true for 8-wire touch screens, 8-wire touch screens have already been eliminated in step 152.

As a result, if the X+ terminal 120 is high, then a 4-wire touch screen is connected. If the X+ terminal 120 is low, then a 4-wire screen may be connected and pressed, or a 5-wire screen may be connected. In this event, the remaining configurations of the table above are utilized. By using the internal pull-up resistors, the analog switch array 104 can be configured to perform relative impedance measurements. If a 5-wire touch screen is connected, the resistance between any two adjacent corners of the touch screen will be less than the resistance diagonally across the touch screen. Because of the way X+/X− and Y+/Y− are connected, this is exactly opposite of a pressed 4-wire touch screen. In a pressed 4-wire touch screen, depending on where the press is occurring, the impedance from X+ to Y+ will be greater than X+ to X−, X+ to Y− will be greater than X+ to X−, Y+ to X+ will be greater than Y+ to Y−, or Y+ to X− will be greater than Y+ to Y−. One of these OR'ed conditions will be true (and they may all be true because the contact resistance is usually fairly high compared to the indium tin oxide layer resistance). As a result, a determination can be made whether a 4-wire touch screen or a 5-wire touch screen is connected based on the relative impedance comparisons set forth above.

Regardless whether a 4-wire or 5-wire touch screen is connected, the process proceeds to step 154 where it is determined whether the touch screen is operating properly. After that, at step 156, it is determined whether the touch screen is pressed. The following table summarizes the operation of the analog switch matrix 104 during steps 154-156 for a 4-wire touch screen:

| STEP | REGISTER | EFFECT | TEST | RESULT |
|------|----------|--------|------|--------|
| 154 | 0401601 | Pull X+ high, Short X− to VSS | Check that X+ is low | Operational |
| 154 | 0804604 | Pull Y+ high, Short Y− to VSS | check that Y+ is low | Operational |
| 154 | 0402601 | Pull X+ high, Short Y+ to VSS | ADC conversion on X+ | Low = touch screen pressed or shorted High = No touch screen press |

The following table summarizes the operation of the analog switch matrix 104 during steps 154-156 for a 5-wire touch screen:

| STEP | REGISTER | EFFECT | TEST | RESULT |
|---|---|---|---|---|
| 154 | 0401601 | Pull X+ high, Short X− to VSS | check that X+ is low | Operational |
| 154 | 0402601 | Pull X+ high, Short Y+ to VSS | check that X+ is low | Operational |
| 154 | 0404601 | Pull X+ high, Short Y− to VSS | check that X+ is low | Operational |
| 156 | 0420601 | Pull X+ high, Short sY+ to VSS | ADC conversion on X+ | Low = touch screen pressed or shorted High = No touch screen press |

Referring now to FIG. 4B, a second method for determining a touch screen type is illustrated. The second method is digital detection method that avoids using the A/D converter 102. False A/D converter readings can occur due to background noise, and other problems. For example, some delta sigma converters produce invalid samples during resynchronization. An analog algorithm may require sampling and averaging to reject noise and false readings. In addition, when detecting differences between a 5-wire touch screen and a pressed 4-wire touch screen for example, timing of the algorithm can be critical in the presence of intermittent or bouncing contact. Although some re-sampling may be required, a digital method can help to avoid potential timing and sampling issues during the algorithm.

At step 172, it is first determined whether a touch screen is connected to the interface circuit 100. The first two parts of this step ensure that the Touch Detect circuit is working. The following table summarizes the operation of the analog switch matrix 104 during step 172:

| STEP | REGISTER | EFFECT | TEST | RESULT |
|---|---|---|---|---|
| 172 | 0000800 | Short X+ to VSS | Check Touch_Detect bit: | High = Operational |
| 172 | 0040000 | Pull X+ high | Check Touch_Detect bit: | Low = Operational |
| 172 | 047F000 | Pull X+ high, Short X−, Y+, Y−, sX+, sX−, sY+, sY− to VSS | Check Touch_Detect bit: | Low = No touch screen connected High = touch screen connected |

The operation is similar to the operation at step 150 as described above, except that the X+ terminal 120 is measured at the output of the inverting logic gate 106.

Assuming a touch screen is connected, it is next determined at step 174 whether a 4-wire or 8-wire touch screen is connected, or whether a 5-wire or 7-wire touch screen is connected. In this step, the Y+ and X+ terminals are first manually shorted together at the touch screen connector. The following table summarizes the operation of the analog switch matrix 104 during step 174:

| STEP | REGISTER | EFFECT | TEST | RESULT |
|---|---|---|---|---|
| 174 | 0840605 | Pull Y+ high, Short sY− to VSS | Check Touch_Detect bit: | Low = 5-wire or 7-wire touch screen connected High = 8-wire or 4-wire touch screen connected |

If step 174 determines that a 4-wire or an 8-wire touch screen is connected (instead of a 5-wire or a 7-wire touch screen), then the process proceeds to step 176, where it is determined whether a 4-wire touch screen is connected or whether an 8-wire touch screen is connected. The following table summarizes the operation of the analog switch matrix 104 during step 176:

| STEP | REGISTER | EFFECT | TEST | RESULT |
|---|---|---|---|---|
| 176 | 0820605 | Pull Y+ high, Short sY+ to VSS, Short Y+ and X+ together | Check Touch_Detect bit: | Low = 4-wire touch screen connected High = 8-wire touch screen connected |

Regardless whether a 4-wire touch screen or an 8-wire touch screen is connected, the process proceeds to steps 178 and 180 where it is determined whether the touch screen is operating properly and whether the touch screen is pressed. The following table summarizes the operation of the analog switch matrix 104 during step 178-180 for a 4-wire touch screen:

| STEP | REGISTER | EFFECT | TEST | RESULT |
|---|---|---|---|---|
| 178 | 0401000 | Pull X+ high, Short X− to VSS | Check Touch_Detect bit: | High = Operational |
| 178 | 0804005 | Pull Y+ high, Short Y− to VSS, Short Y+ and X+ together | Check Touch_Detect bit: | High = Operational |
| 178 | 0404005 | Pull X+ high, Short Y− to VSS, Short Y+ and X+ together | Check Touch_Detect bit: | High = Operational |
| 180 | 0402000 | Pull X+ high, Short Y+ to VSS | Check Touch_Detect bit: | High = touch screen pressed or shorted Low = No touch screen press |

The following table summarizes the operation of the analog switch matrix 104 during step 178-180 for an 8-wire touch screen:

| STEP | REGISTER | EFFECT | TEST | RESULT |
|---|---|---|---|---|
| 178 | 0401000 | Pull X+ high, Short X− to VSS | Check Touch_Detect bit: | High = Operational |
| 178 | 0408000 | Pull X+ high, Short sX+ to VSS | Check Touch_Detect bit: | High = Operational |
| 178 | 0410000 | Pull X+ high, Short sX− to VSS | Check Touch_Detect bit: | High = Operational |
| 178 | 0804005 | Pull Y+ high, Short Y− to VSS, Short Y+ and X+ together | Check Touch_Detect bit: | High = Operational |
| 178 | 0820005 | Pull Y+ high, Short sY+ to VSS, Short Y+ and X+ together | Check Touch_Detect bit: | High = Operational |
| 178 | 0840005 | Pull Y+ high, Short sY− to VSS, Short Y+ and X+ together | Check Touch_Detect bit: | High = Operational |
| 180 | 0402000 | Pull X+ high, Short Y+ to VSS | Check Touch_Detect bit: | High = touch screen pressed or shorted Low = No touch screen press |

If it is determined at step 174 that a 5-wire or 7-wire touch screen is connected (instead of a 4-wire or an 8-wire touch screen), then the process proceeds to step 182, where it is determined whether a 5-wire touch screen is connected or whether an 7-wire touch screen is connected. The following table summarizes the operation of the analog switch matrix 104 during step 182:

| STEP | REGISTER | EFFECT | TEST | RESULT |
|---|---|---|---|---|
| 182 | 0408000 | Pull X+ high, Short sX+ to VSS | Check Touch_Detect bit: | Low = 5-wire touch screen connected High = 7-wire touch screen connected (5 wire with feedback) |

Regardless whether a 5-wire touch screen or an 7-wire touch screen is connected, the process proceeds to steps 178 and 180 where it is determined whether the touch screen is operating properly and whether the touch screen is pressed. The following table summarizes the operation of the analog switch matrix 104 during step 178-180 for a 5-wire touch screen:

| STEP | REGISTER | EFFECT | TEST | RESULT |
|---|---|---|---|---|
| 178 | 0401000 | Pull X+ high, Short X− to VSS | Check Touch_Detect bit: | High = Operational |
| 178 | 0402000 | Pull X+ high, Short Y+ to VSS | Check Touch_Detect bit: | High = Operational |

-continued

| STEP | REGISTER | EFFECT | TEST | RESULT |
|---|---|---|---|---|
| 178 | 0404000 | Pull X+ high, Short Y− to VSS | Check Touch_Detect bit: | High = Operational |
| 180 | 0420000 | Pull X+ high, Short sY+ to VSS | Check Touch_Detect bit: | High = touch screen pressed or shorted Low = No touch screen press |

The following table summarizes the operation of the analog switch matrix 104 during step 178-180 for a 7-wire touch screen:

| STEP | REGISTER | EFFECT | TEST | RESULT |
|---|---|---|---|---|
| 178 | 0401000 | Pull X+ high, Short X− to VSS | Check Touch_Detect bit: | High = Operational |
| 178 | 0402000 | Pull X+ high, Short Y+ to VSS | Check Touch_Detect bit: | High = Operational |
| 178 | 0404000 | Pull X+ high, Short Y− to VSS | Check Touch_Detect bit: | High = Operational |
| 178 | 0408000 | Pull X+ high, Short sX− to VSS | Check Touch_Detect bit: | High = Operational |
| 178 | 0410000 | Pull X+ high, Short sX− to VSS | Check Touch_Detect bit: | High = Operational |
| 180 | 0420000 | Pull X+ high, Short sY+ to VSS | Check Touch_Detect bit: | High = touch screen pressed or shorted Low = No touch screen press |

In the above examples, infinite impedance (open circuit) and relative impedance sensing techniques are used to test touch screen resistances. Similar techniques could also be applied to perform other types of impedance sensing, for example, in connection with capacitive touch screens. Various capacitance sensing techniques could be used to distinguish between various types of capacitive touch screens and/or to distinguish capacitive touch screens from resistive touch screens.

3. Touch Screen Data Processing

Once a determination has been made regarding the touch screen type to which the interface circuit 100 is connected, various values are written in the registers 112-118 in accordance with the touch screen type that has been detected.

The following table shows the values stored in the registers 112-118 for each of the four types of touch screens.

|  | DETECT | DISCHARGE | XSAMPLE | YSAMPLE |
|---|---|---|---|---|
| 4-wire touch screen | 0402608 | 007FE0C | 00F960C | 017C603 |
| 5-wire touch screen | 0420620 | 007FE20 | 01DD620 | 02DB620 |
| 7-wire touch screen | 0420620 | 307F820 | 31DD020 | 32DB020 |

-continued

|  | DETECT | DISCHARGE | XSAMPLE | YSAMPLE |
|---|---|---|---|---|
| 8-wire touch screen | 0402608 | 007FE0C | 308100C | C104003 |

The values written in the registers 112-118 customize an otherwise generic scanning process (generic in the sense that it can be used with multiple types of touch screens) for use with the particular type of touch screen actually connected to the touch screen interface circuit 100. Because the process is otherwise generic, it is possible to use a common data processing path regardless of which touch screen type is used.

Figure 6:
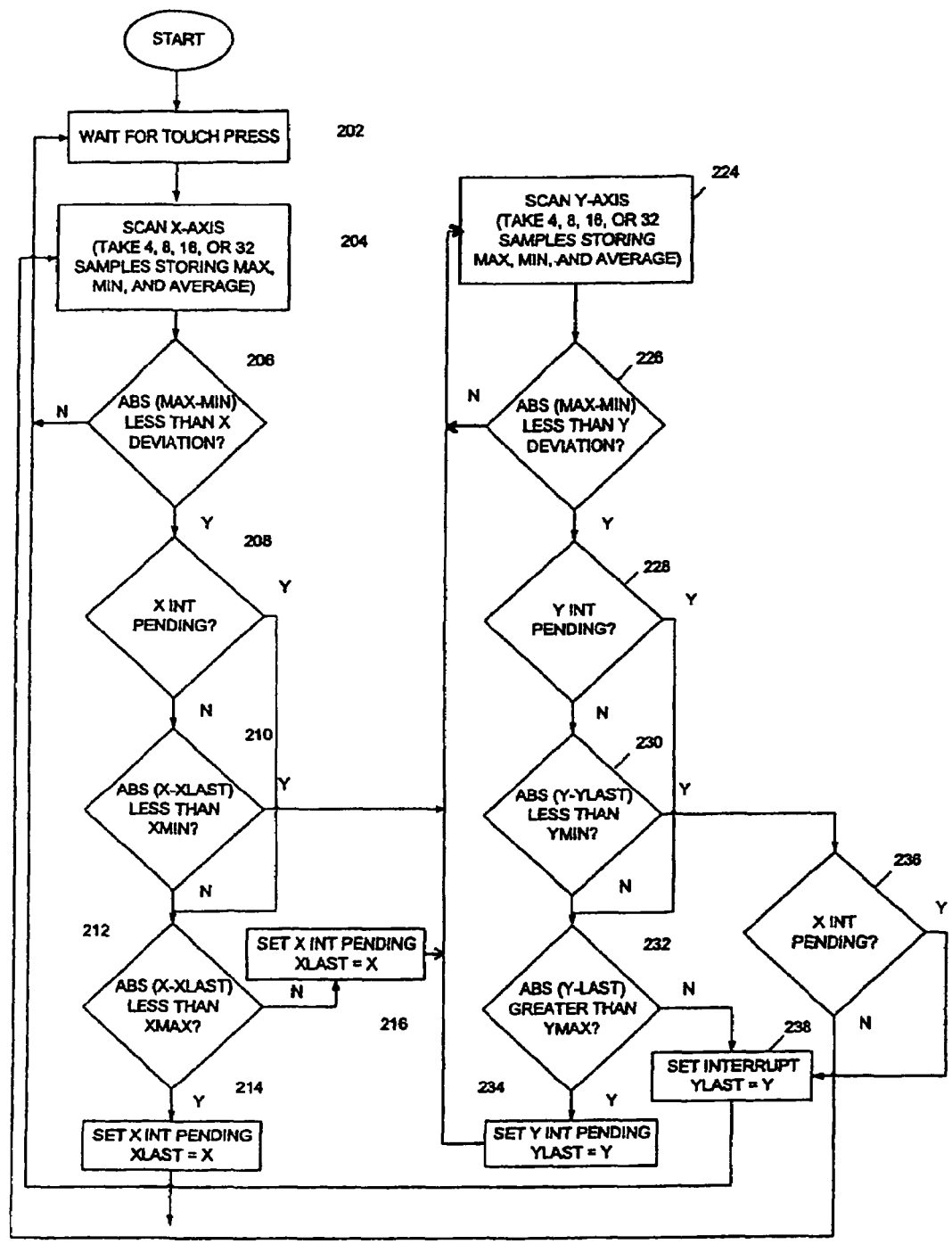
FIG. 6 is a flow chart of a scanning process used by the touch screen interface circuit of FIG. 3.

FIG. 6 is a flowchart that illustrates the preferred scanning process. While the process of FIG. 6 is usable in connection with any form of operator interface, the process of FIG. 6 is particularly useful in connection an interface that emulates a hardware mouse by receiving operator inputs and moving a mouse pointer across a touch screen in response. Although the mouse pointer in a Windows™ interface is often an arrow that appears to point to a location, other shapes are also extremely common. Herein, the term "mouse pointer" is used to refer to any graphic marker on a display that is intended to identify a location on the display.

The process of FIG. 6 is preferably implemented using digital signal processing circuitry that is not part of the microprocessor 86 of the system-on-chip integrated circuit 70. This allows the touch screen to be serviced by a device other than the microprocessor, thereby reducing microprocessor overhead. Even more preferably, the process of FIG. 6 is preferably implemented using discrete logic circuitry (as opposed to another microprocessor). The output of the discrete logic circuitry is an event notification, preferably in the form of a hardware interrupt provided to the microprocessor 86, which notifies the microprocessor 86 that the mouse pointer has moved by at least a predetermined amount, and provides the microprocessor 86 with updated location information. As a result, the microprocessor 86 is interrupted only when touch screen movement is sufficiently significant. Therefore, intervention of the microprocessor 86 in the scanning process is minimized.

FIG. 7 is a block diagram of a logic circuit 250 that is used to implement the computational aspects of the process embodied in the flowchart of FIG. 6. The logic circuit 250 is part of the touch screen interface circuit 100. The logic circuit 250 preferably performs all sampling, averaging, and range checking for samples acquired by the A/D converter 102 from the touch screen sensor circuitry. The sequential aspects of the process of FIG. 6 are implemented in a state machine 251. In addition to controlling the overall sequence of operations in FIG. 7, the state machine 251 is also used to program the analog switch matrix with values from the registers 112-118 as the process proceeds. The individual states of the state machine 251 track the steps of the flow chart of FIG. 6 and therefore are not separately shown. In this regard, it may be noted that a circuit layout for the entire discrete logic circuit 250 including the state machine 251 may be generated using a hardware description language (HDL) such as verilog of VHDL (VHASIC (Very High level ASIC) Hardware Description Language).

If desired, provision may also be made to disable the touch screen circuitry of FIG. 7 and allow the microprocessor 86 to directly control the A/D converter 102 and the analog switch matrix 104. This allows for the implementation of additional scanning algorithms if desired. Assuming the microprocessor 86 does not directly control the A/D converter 102 and the analog switch matrix 104, then the responsibilities of the microprocessor 86 in the scanning process are simply to load all of the setup registers for the touch array scanning and enable the state machine 251 during initialization, and then respond to incoming event notifications during normal operation. The logic circuit 250 is preferably responsible for scanning the touch screen and acquiring data samples, verifying that the deviation in the sample set is less than a predetermined amount, averaging the samples to determine the X and Y locations of the touch, verifying that any movement in the touch location is not so large as to be unrealistic, and verifying that any movement is large enough to issue an event notification to the microprocessor 86.

For all touch screen types, the touch screen X and Y axis positioning are preferably linear so that all algorithms (described below) have linear operation characteristics. In other words, the voltage that is sampled by the A/D converter 102 is preferably linearly related to the X-position or the Y-position of the touch, depending on which axis is being scanned. Thus, a minimum sample voltage corresponds to a minimum position along the X-axis, a maximum sample voltage corresponds to a maximum position along the X-axis, and there is a linear relationship between voltage and position between these two extremes. For 8-wire and 4-wire touch screens, this is normally the case by virtue of the manner in which these touch screens are constructed. Most 5-wire and 7-wire touch screens are constructed with proprietary compensation techniques and are sufficiently close to linear to produce acceptable results. For those that produce non-linear results, the returned values can be adjusted in firmware in conventional fashion to determine screen position.

Figure 8:
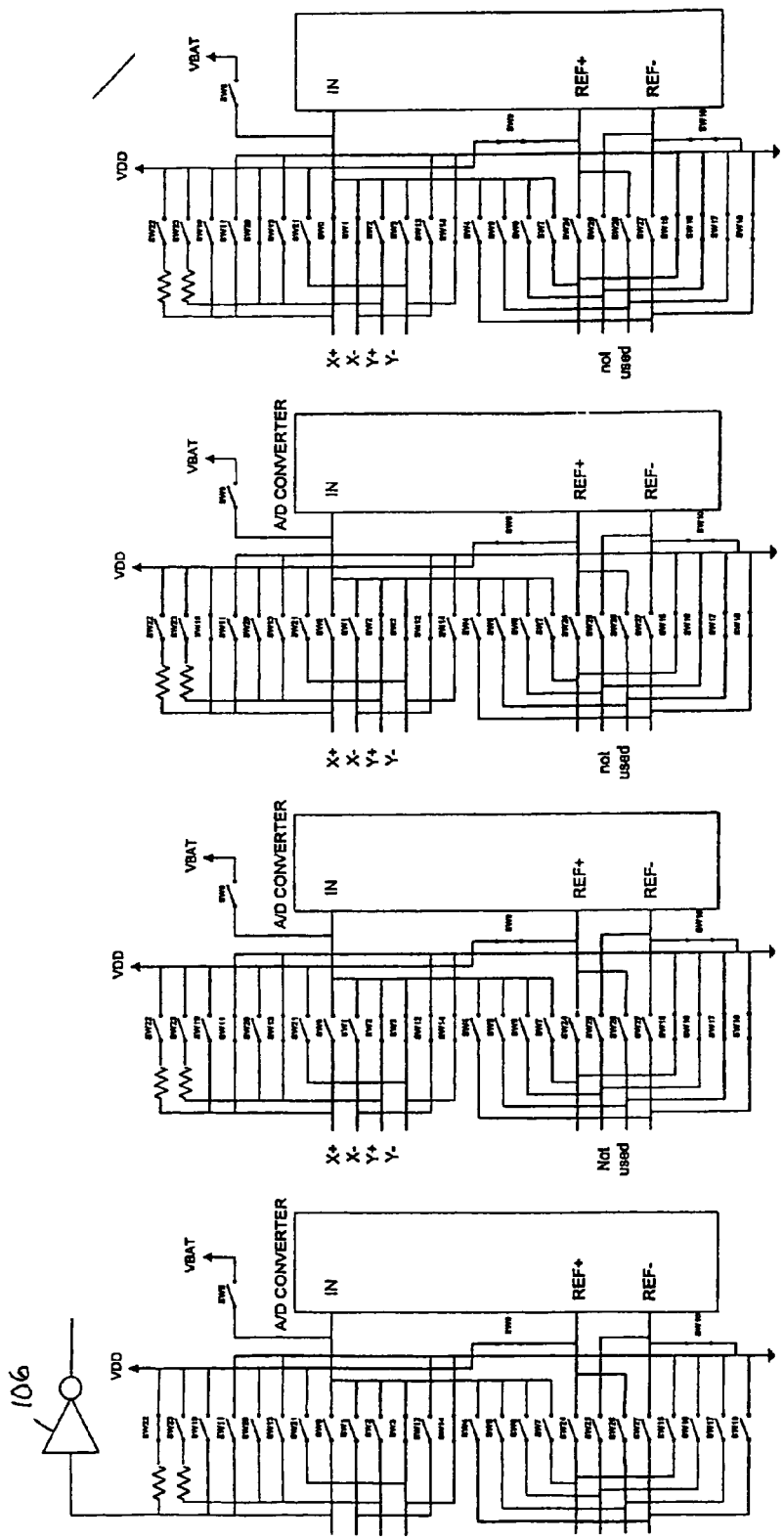
FIGS. 8A-8D are schematic diagrams showing the configuration of the touch screen interface of FIG. 3 during different steps of the scanning process of FIG. 6 for a first type of touch screen.

The process begins at a touch detect step 202 in which the system waits for a touch press. The switches SW0-SW27 in the touch detect step 202 are controlled by the value in the DETECT register 112. The configuration of the analog switch matrix in step 202 for a 4-wire touch screen is shown in FIG. 8A. The touch press signal is generated at the output of the inverting logic gate 106. The process stays at the touch detect step 202 until a touch is detected, at which point the process to the next step.

At step 204, the X-axis is scanned. The first step to scanning the X-axis is to discharge the touch screen, wait for a predetermined settling time to elapse, apply a voltage to scan the X-axis, and then wait for another predetermined settling time to elapse. This sequence of events allows for any residual voltage in the touch screen sensor circuitry to be discharged and for the touch screen sensor circuitry to reach stable operating conditions after a scanning voltage is applied and before samples are acquired. FIG. 8B shows the configuration of the analog switch matrix 104 for a 4-wire touch screen to discharge the touch screen sensor circuitry. FIG. 8C shows the configuration of the analog switch matrix 104 for a 4-wire touch screen to apply a voltage to the touch screen sensor circuitry to scan the X-axis.

The A/D converter 102 begins acquiring samples after the scanning voltage is applied and after the touch screen sensor circuitry reaches stable operating conditions. To allow a simple division to be implemented as described below, the number of samples taken is preferably either 4, 8, 16, or 32. Each sample is a voltage sample acquired from the X+ bus bar (e.g., if a 4-wire touch screen is being scanned). However, since voltage and position are linearly related as previously described, each sample also represents a particular X-position on the screen. Ideally, the samples should be very close together (that is, the deviation should be small); if they are not, the sample set is discarded as described below.

As the samples are acquired during step 204, the maximum sample value, the minimum sample value, and an average sample value are determined and stored. As previously mentioned, the calculations described in the flowchart of FIG. 6 are performed by the discrete logic circuitry of FIG. 7. As shown therein, the A/D converter 102 samples the analog voltages acquired via the analog switch matrix 104 (see FIG. 3). The sample acquired by the A/D converter 102 is provided to a MIN sample register 252, a MAX sample register 254, and multiplexors 256 and 258. The MIN register 252 is initialized to a value of 4095 and the MAX register 254 is initialized to a value of zero. When the first sample is acquired, the first sample is passed to the comparator 260 by the multiplexor 258. At the same time, the value in the MIN sample register 252 is passed to the comparator 260 by the multiplexor 256. The comparator 260 compares the first sample to the value in the MIN sample register 252. In the illustrated embodiment, the A/D converter 102 is a twelve bit A/D converter, and therefore the output of the A/D converter cannot exceed 4095. Therefore, the first sample is lower than the initial value stored in the MIN sample register 252, and the first sample replaces the value stored in the MIN sample register 252. Thereafter, the first sample is also provided to the multiplexor 256 and passed to the comparator 260. At the same time, the value in the MAX sample register 254 is passed by the multiplexor 258 to the comparator 260. The comparator 260 compares the value stored in the MAX sample register 254 with the first sample. Since the MAX sample register 254 is initialized to zero, the first sample is greater than the value stored in the MAX sample register, and the first value replaces the value stored in the MAX sample register 254. Thereafter, as new samples are acquired, the new samples are compared with the values stored in the MIN and MAX sample registers 252 and 254, and after all of the samples have been acquired, the minimum sample will be stored in the MIN sample register 252, and the maximum sample will be stored in the MAX sample register 254.

In addition to determining the minimum and maximum sample values, the circuitry also determines an average sample value. To this end, as the samples are acquired, the samples are also provided to an adder 264 which cooperates with an accumulate and shift register circuit 266. The accumulate and shift register 266, which is initially set equal to zero, adds each sample to the previously acquired samples. When all of the samples have been acquired, the accumulate and shift register 266 outputs a value that is equal to the summation of all acquired samples. The resulting value is shifted by 2, 3, 4, or 5 places to divide by the number of samples. This is achieved using the tap circuit 267, which receives a 17 bit input and outputs only the twelve most significant bits (i.e., for division by 32). In other words, if thirty-two (i.e., $2^5$) samples are acquired, then discarding the first five bits of the output of the accumulate and shift register 266 effectively divides the output of the register 266 by thirty-two and produces an average sample value. The average sample value is then considered to be the value that describes the X-position of the touch.

At step 206, it is determined whether the difference between the maximum and minimum X samples is less than a predetermined maximum deviation. In other words, as previously mentioned, all of the acquired samples should indicate that the touch occurred at approximately the same location on the touch screen, otherwise the data set as a whole is suspect and should be discarded. This range checking function allows a data set to be screened for erroneous data points (possibly caused by noise) that would adversely affect an average value.

It may be noted that, when the analog switch matrix 104 is in the configuration shown in FIG. 8A, relatively little power is dissipated as compared to when the analog switch matrix 104 is in a configuration usable for scanning (as in FIGS. 8C and 8D, discussed below). When the switch matrix is in a scanning configuration, current flows to the X-axis and Y-axis resistive layers (i.e., in the case of a 4-wire or 8-wire touch screen). Specifically, an initial current flows when the scanning voltage is first applied, causing a charge to be established on the X-axis and Y-axis resistive layers (which in combination initially behave as a capacitor). Once the charge is established, current also flows from the X+ bus bar to the X− bus bar when a scanning signal is applied to scan the X-axis, and from the Y+ bus bar to the Y− bus bar when a scanning signal is applied to scan the Y-axis. In the case of a 5-wire touch screen, current flows between each of the four terminals. This current flow in turn causes power to be dissipated. In contrast, when the analog switch matrix 104 is in a touch detect configuration (as in FIG. 8A), relatively little or no current flows to the X-axis and Y-axis layers from the analog switch matrix 104 (as compared to the current that flows while the analog switch matrix 104 is in configuration shown in FIGS. 8C and 8D). Therefore, relatively little or no power is dissipated by the X-axis and Y-axis resistive layers (as compared to the power that is dissipated while the analog switch matrix 104 is in the configuration shown in FIGS. 8C and 8D).

In practice, in FIG. 7, step 206 is performed in the following manner: First, the value stored in the MIN register 252 is subtracted from the value stored in the MAX register 254. This is accomplished by providing the value in the MIN sample register 252 to a multiplexor 272 and providing the value stored in the MAX sample register 254 to a multiplexor 270. The multiplexors 270 and 272 pass the maximum and minimum sample values, respectively, to a subtractor circuit (or any other form of comparator circuit) 274. The difference is then compared to the predetermined maximum deviation XDEV stored in the register 280. This is achieved by providing the output of the subtractor circuit 274 to a multiplexor 276 which passes the difference to a comparator 278. The comparator 278 compares the difference to the value XDEV provided by a deviation register 280 by way of a multiplexor 282. If the range exceeds the deviation allowed, the results are disregarded and the logic circuit 250 starts over with initialization and generating a new X sample set.

At step 208, it is determined whether an XINT flag is set. On the initial pass through the process of FIG. 6, the XINT flag is not set and the process proceeds to step 210. As will become apparent, this flag is set when the process proceeds from step 210 to step 212, allowing step 210 to be skipped thereafter.

At step 210, a comparison is made between the new X average sample value (X) (that is, the average X sample value determined in step 204) and the last valid X average sample value (XLAST) (that is, the average X sample determined during the previous successful iteration of step 204). Specifically, the difference (X-XLAST) between these two values is compared against the XMIN value stored in the XMIN register 290. In FIG. 7, this step is performed by providing the output of the tap circuit 267 to the subtractor circuit 274 by way of the multiplexor 272, and by providing the value stored in the LAST X register 286 to the subtractor circuit 274 by way of the multiplexor 270. The output of the subtractor circuit 274 is then provided to the comparator 278 by way of the multiplexor 282. The comparator 278 compares the difference to the value stored in the XMIN register 290, which is received at the comparator 278 by way of the multiplexor 276.

If the difference between the new X value (X) and the last X value (XLAST) is less than the XMIN value, then this indicates that the movement in the X direction is not significant enough to warrant alerting the microprocessor 86. Therefore, the process proceeds to step 224 (discussed below), which is the beginning of the scanning process for the Y-axis.

If the difference between the new X value (X) and the last X value (XLAST) is not less than the XMIN value, then this indicates that the movement in the X direction is significant enough to warrant alerting the microprocessor 86 (that is, so long as the movement in the Y-direction is also significant enough to warrant alerting the microprocessor, as discussed below). The process in this event proceeds to step 212, where the difference between the new X value (X) and the last X value (XLAST) is compared to the XMAX value in the XMAX register 292. The purpose of this step is to verify that any movement in the touch location is not so large as to be unrealistic.

In FIG. 7, step 212 is performed by comparing the output of the subtractor circuit 274 (X-XLAST) to the value stored in the XMAX register 292, which is received by way of the multiplexor 282. If the difference is greater than XMAX, it is assumed that this distance is too far for a touch input to possibly move in the short scan time interval and that the key press is invalid. However, at step 214, the new X value is stored as the LAST X register (that is, XLAST is set equal to X) in case a truly new location was determined. The XINT flag is also set to cause the algorithm to skip step 210 on consecutive sample sets. This flag will also cause a processor interrupt after valid X and Y samples have been established. The algorithm then starts over discharging, and sampling a new X-axis value.

If the difference in step 212 is less than the XMAX, then the process proceeds to step 216. At step 216, just as in step 214, the new X value is stored as the LAST X register (that is, XLAST is set equal to X) and the XINT flag is also set to cause the algorithm to skip step 210 on consecutive sample sets. After step 216, unlike after step 214, the process then proceeds to step 224, where scanning of the Y-axis begins. In the exemplary process of FIG. 6, both the XINT flag and the YINT flag must be set in order for an event notification (such as a hardware interrupt) to be issued to the microprocessor 86.

Except to the extent that a different axis is scanned, scanning of the Y-axis is identical to the scanning of the X-axis, and therefore the process will be described more briefly. The circuitry in FIG. 7 is used as previously described, except that registers 294, 296 and 298 are used instead of registers 286, 290, and 298, respectively.

Scanning of the Y-axis begins at step 224. FIG. 8D shows the configuration of the analog switch matrix 104 for a 4-wire touch screen to apply a voltage to the touch screen sensor circuitry to scan the Y-axis. Again, 4, 8, 16 or 32 samples are acquired, and the maximum sample value, the minimum sample value, and an average sample value are determined and stored.

At step 226, it is determined whether the difference between the maximum and minimum Y samples is less than a predetermined maximum deviation. As previously described, this range checking function allows a data set to be screened for erroneous data points (possibly caused by noise) that would adversely affect an average value. If the range exceeds the deviation allowed, the results are disregarded and the logic circuit 250 starts over with initialization and generating a new sample set at step 224.

At step 228, it is determined whether a YINT flag is set. On the initial pass through the process of FIG. 6, the YINT flag is not set and the process proceeds to step 210. The YINT flag serves the same purpose as the XINT flag as described above, except that it is used in connection with the Y-axis portion of the process of FIG. 6.

At step 230, a comparison is made between the new Y average sample value (Y) (that is, the average Y sample value determined in step 224) and the last valid Y average sample value (YLAST) (that is, the average Y sample determined during the previous iteration of step 204). Specifically, the difference (Y-YLAST) between these two values is compared against a YMIN value. If the difference (Y-YLAST) is less than the YMIN value, then this indicates that the movement in the Y direction is not significant enough to warrant alerting the microprocessor. Therefore, the process proceeds to step 236 to determine whether the XINT flag is set. If the XINT flag is set, then at step 238 the new Y value is stored as the LAST Y register (that is, YLAST is set equal to Y), the microprocessor is notified, and the new X and Y values are read by the microprocessor and the XINT and YINT flags are cleared. Thereafter, the process returns to step 202 and waits for another touch press. Otherwise, if the XINT flag is not set at step 236, then the process proceeds to step 204 to rescan to X axis.

If the difference (Y-YLAST) is not less than the YMIN value, then this indicates that the movement in the Y direction is significant enough to warrant alerting the microprocessor. The process in this event proceeds to step 232, where the difference between the new Y value (Y) and the last Y value (YLAST) is compared to the YMAX value. The purpose of this step is to verify that the distance of Y movement is not so large as to be unrealistic given the short scan time interval. If the difference in step 232 is greater than YMAX, then at step 234 the new Y value is stored as the LAST Y register (that is, YLAST is set equal to Y) in case a truly new location was determined. The YINT flag is also set to cause the algorithm to skip step 230 on consecutive sample sets.

If the difference in step 232 is less than the YMAX, then the process proceeds to step 238. At step 238, just as in step 214, the new Y value is stored as the LAST Y register (that is, YLAST is set equal to Y) and the YINT flag is also set. When either interrupt flag is set, the microprocessor is notified, and the new X and Y values are read by the microprocessor and the XINT and YINT flags are cleared. Thereafter, the process returns to step 202 and waits for another touch press.

Figure 9:
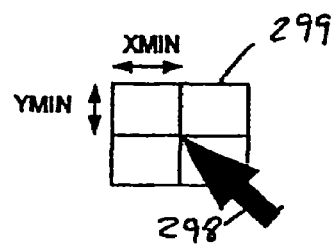
FIG. 9 is a representation of a minimum move notification system embodied in the flowchart of FIG. 6.

As has been described, rather than sending a continuous information stream to the microprocessor when the touch screen is in use, the logic circuit 250 interrupts the microprocessor only when touch screen movement is sufficiently significant in order to minimize intervention of the microprocessor in the scanning process. FIG. 9 presents a simplified graphical representation of this arrangement. As shown in FIG. 9, the values XMIN and YMIN (stored in the registers 290 and 296) define a region 299 that surrounds the current location of a mouse pointer 298. The microprocessor 86 is not notified unless a touch is detected at a location outside the perimeter of the region 299.

4. Exemplary Application

Figure 10:
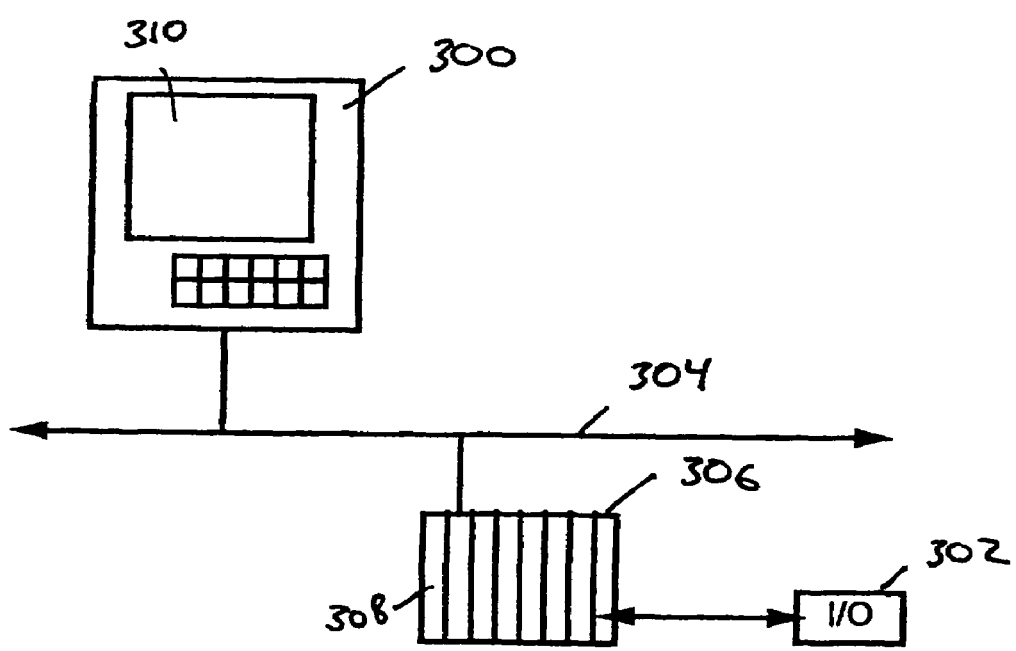
FIG. 10 is a first industrial control system having an operator interface that incorporates the touch screen interface circuit of FIG. 3.

Referring now to FIG. 10, the system-on-chip integrated circuit 70 of FIG. 2 is usable in a wide array of applications. FIG. 10 illustrates the system-on-chip integrated circuit 70 employed in an operator interface 300 of a legacy configuration for an industrial control system. In addition to the operator interface, the industrial control system comprises a plurality of input and output devices 302, a communication network 304, a rack-mounted programmable controller system 306. The operator interface 300 could also be used in connection with non-rack mounted devices such as soft PLCs. In addition to these components, the industrial control system may include a wide array of additional components.

The programmable controller system 306 comprises a control module 308. The control module 308 executes a user program to control output status of the plurality of output devices based on input status information from the plurality of input devices.

The programmable controller system 306 and the operator interface 300, which may also be rack-mounted, are coupled to each other by way of the communication network 304. The operator interface 300 includes a touch screen that includes a display 310 and a touch screen sensor system such as shown in FIGS. 1A-1D. The display 310 displays the input and output status of at least a portion of the plurality of input and output devices 302. The touch screen may, for example, be a 4-wire, 5-wire, 7-wire, or 8-wire touch screen, each of which uses a different sensor system as previously discussed.

The operator interface 300 is provided with a system-on-chip integrated circuit 70. The integrated circuit 70 therefore includes the circuitry discussed above in connection with the preferred touch screen interface circuit 100, including an analog switch matrix 104, digital signal processor, communication network interface, display interface, and so on (see FIGS. 2-3 and 7). As previously discussed, the analog switch matrix 104 is coupled to the touch screen sensor system and has a plurality of different configurations. The analog switch matrix receives power supply inputs ($V_{DD}$, $V_{SS}$) and selectively supplies these input to the touch screen sensor system based on the configuration of the analog switch matrix 104. The digital signal processor determines the touch screen type based on the response of the touch screen to the input in the plurality of different configurations of the analog switch matrix, for example, as discussed in connection with FIGS. 4 and 5A-5D. The digital signal processor can also process the input data samples from the touch screen, for example, as discussed above in connection with FIGS. 6-7.

Figure 11:
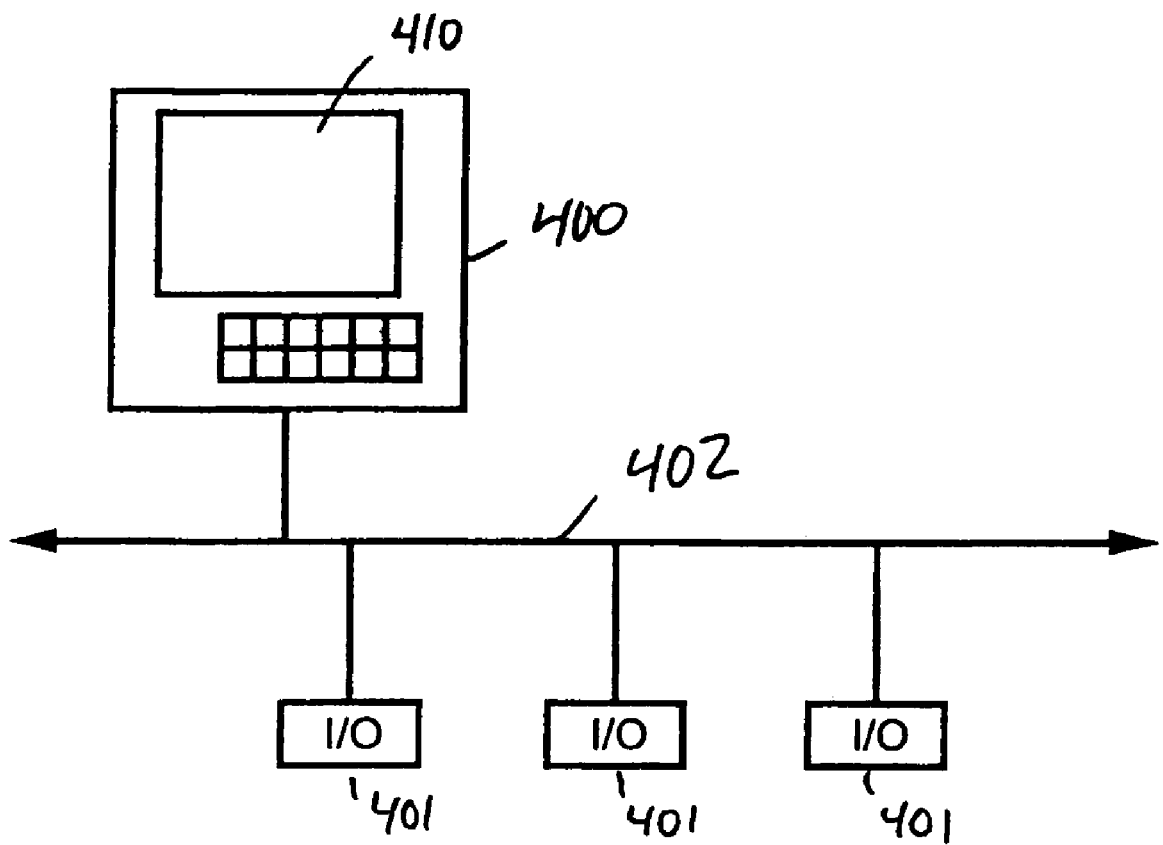
FIG. 11 is a second industrial control system having an operator interface that incorporates the touch screen interface circuit of FIG. 3.

Referring now to FIG. 11, FIG. 11 illustrates the system-on-chip integrated circuit 70 employed in an operator interface 400 that may also be used as a soft controller in the industrial control system. In addition to the operator interface, the industrial control system also comprises a plurality of input and output devices 401, and multiple data or control networks 402. In addition to these components, the industrial control system may include a wide array of additional components.

In addition to providing operator controls and displaying status, the operator interface 400 also executes a user program to control output status of the plurality of output devices based on input status information from the plurality of input devices. Thus, the operator interface 400 of FIG. 11 combines the functions of the programmable controller system 306 and the operator interface 300 of FIG. 10 in a single integrated package.

The operator interface 400 preferably includes a touch screen sensor system such as shown in FIGS. 1A-1D. The operator interface 400 may or may not contain a dynamic display 410 that will display the input and output status of at least a portion of the plurality of input and output devices 401. As an alternative to a display, a fixed graphic underlay may be used to represent the plurality of input and output devices 401. In either case, the touch plane operator input device may, for example, be a 4-wire, 5-wire, 7-wire, or 8-wire device, each of which uses a different sensor system as previously discussed.

The operator interface 400 is provided with a system-on-chip integrated circuit 70. The integrated circuit 70 therefore includes the circuitry discussed above in connection with the preferred touch screen interface circuit 100, including an analog switch matrix 104, digital signal processor, communication network interface, display interface, and so on (see FIGS. 2-3 and 7). As previously discussed, the analog switch matrix 104 is coupled to the touch screen sensor system and has a plurality of different configurations. The analog switch matrix receives power supply inputs ($V_{DD}$, $V_{SS}$) and selectively supplies these input to the touch screen sensor system based on the configuration of the analog switch matrix 104. The digital signal processor determines the touch screen type based on the response of the touch screen to the input in the plurality of different configurations of the analog switch matrix, for example, as discussed in connection with FIGS. 4 and 5A-5D. The digital signal processor can also process the input data samples from the touch screen, for example, as discussed above in connection with FIGS. 6-7.

In addition to the applications illustrated in FIG. 10 and FIG. 11, numerous additional applications are also possible. For example, the integrated circuit 70 can be used in connection with personal digital assistants and other palm-held computers, as well as internet access devices, laptop computers, point of sale terminals, input only touch pads for larger displays or virtual headsets, consumer appliances, entertainment systems and other commercial and industrial applications. Indeed, in FIG. 10, the operator interface 300 may be coupled to the internet to permit firmware revisions to be downloaded from a manufacturer of the programmable controller system.

Many other changes and modifications may be made to the present invention without departing from the spirit thereof. The scope of these and other changes will become apparent from the appended claims.

What is claimed is:

1. An integrated circuit that provides compatibility with a plurality of a touch plane operator input device, comprising:
   a microprocessor; and
   a touch device interface that interfaces the microprocessor to a touch plane operator input device, the touch device interface is compatible with a plurality of touch plane operator input devices and automatically detects the type of the touch plane operator input device comprising a touch pad, an analog resistive touch screen, a capacitive touch screen and an electrostatic touch screen, the touch device interface further automatically detects type of the analog resistive touch screen comprising a 4-wire touch screen, a 5-wire touch screen, a 7-wire touch screen, or an 8-wire touch screen, wherein the 5-wire touch screen comprises a wiper terminal, the 7-wire touch screen comprises two voltage feedback terminals and the 8-wire touch screen comprises four voltage feedback terminals.

2. The circuit of claim 1, the type of the touch plane operator input device is determined based at least in part upon interface characteristics of the touch plane operator input device.

3. The circuit of claim 2, the interface characteristics are determined based upon impedance characteristics of the touch plane operator input device.

4. The system of claim 3, wherein the impedance characteristics of the touch plane operator input device comprise infinite impedance and relative impedance.

5. The circuit of claim 2, the interface characteristics are based at least in part upon a size of the touch plane operator input device, wherein the touch plane operator input devices having large size include the voltage feedback terminals to compensate for effects of resistance and temperature drift.

6. The circuit of claim 1, further comprising a digital signal processing circuit that reduces utilization of the microprocessor, the digital signal processing circuit distinguishes significant operator interaction with the touch plane operator input device from insignificant operator interaction with the touch plane operator input device and notifies the microprocessor when the operator interaction with the touch plane operator input device is significant.

7. The circuit of claim 6, the digital signal processing circuit compares the displacement between a first touch and a second touch with a minimum value and determines that the operator interaction is significant if the displacement is greater than the minimum value.

8. The circuit of claim 6, the digital signal processing circuit compares the displacement between a first touch and a second touch with a maximum value and determines that the operator interaction is significant if the displacement is less than the maximum value.

9. The circuit of claim 6, the digital signal processing circuit compares an x-axis displacement and a y-axis displacement between a first touch and a second touch with an x-axis minimum value and a y-axis minimum value and determines that the operator interaction is significant if one of the x-axis displacement is greater than the x-axis minimum value and the y-axis displacement is greater than the y-axis minimum value.

10. The system of claim 1, wherein the voltage feedback terminals provide voltage feedback to eliminate effects of resistance and temperature drift due to large screen size.

11. A methodology for providing compatibility for a touch device interface, comprising:
   determining automatically type of a touch plane operator input device comprising a touch pad, an analog resistive touch screen, a capacitive touch screen and an electrostatic touch screen;
   determining automatically subtype of the touch plane operator input device for the analog resistive touch screen comprising a 4-wire touch screen, a 5-wire touch screen, a 7-wire touch screen, or an 8-wire touch screen based at least in part upon interface characteristics of the touch plane operator input device, the interface characteristics being determined based upon impedance characteristics of the touch plane operator input device; and
   configuring the touch device interface to operate with the touch plane operator input device.

12. The method of claim 11, further comprising determining automatically a subtype of the touch plane operator input device based upon at least upon one of impedance characteristics of the touch plane operator input device, the size of the touch plane operator input device and a value of a detect bit.

13. The method of claim 11, further comprising:
   determining a first coordinate based upon a first touch on the touch plane operator input device;
   determining a second coordinate based upon a second touch on the touch plane operator input device;
   distinguishing significant inputs to the touch plane operator device from insignificant inputs based upon the displacement between the first coordinate and the second coordinate; and
   notifying a microprocessor when a significant input is detected.

14. The method of claim 13, distinguishing significant inputs further comprises:
   determining an x-axis displacement between the first coordinate and the second coordinate;
   comparing the x-axis displacement to an x-axis minimum value;
   if the x-axis displacement is less than the x-axis minimum value:
      determining a y-axis displacement between the first coordinate and the second coordinate; and
      comparing the y-axis displacement to a y-axis minimum value; and
   ensuring that at least one of the x-axis displacement is greater than the x-axis minimum value and the y-axis displacement is greater than the y-axis minimum value.

15. The method of claim 11, further comprising reducing power consumption to extend battery life by waiting in a touch detect mode until a touch is detected, the touch plane operator input device is substantially free of current flow in the touch detect mode.

16. A system that provides compatibility for a touch device interface, comprising:
   means for discovering automatically type of a touch plane operator input device comprising a 4-wire analog resistive touch screen, a 5-wire analog resistive touch screen, a 7-wire analog resistive touch screen, or an 8-wire analog resistive touch screen based at least in part upon interface characteristics of the touch plane operator input device;
   means for configuring the touch device interface to operate with the touch plane operator input device;
   means for receiving a first coordinate based upon a first touch on the touch plane operator input device;
   means for receiving a second coordinate based upon a second touch on the touch plane operator input device;
   means for differentiating significant inputs to the touch plane operator device from insignificant inputs based upon the displacement between the first coordinate and the second coordinate; and
   means for alerting a microprocessor when a significant input is detected.

17. The system of claim 16, further comprising means for discovering automatically a subtype of the touch plane operator input device based upon at least upon one of impedance characteristics of the touch plane operator input device, the size of the touch plane operator input device and a value of a detect bit.

18. The system of claim 17, means for differentiating significant inputs further comprises:
   means for discovering an x-axis displacement between the first coordinate and the second coordinate;
   means for comparing the x-axis displacement to an x-axis minimum value;
   if the x-axis displacement is less than the x-axis minimum value:
      means for discovering a y-axis displacement between the first coordinate and the second coordinate; and
      means for comparing the y-axis displacement to a y-axis minimum value; and
   means for ensuring that at least one of the x-axis displacement is greater than the x-axis minimum value and the y-axis displacement is greater than the y-axis minimum value.

19. The system of claim 16, further comprising means for reducing power consumption to extend battery life by waiting in a touch detect mode until a touch is detected, the touch plane operator input device is substantially free of current flow in the touch detect mode.

* * * * *